US012568550B2

(12) United States Patent
Hahn et al.

(10) Patent No.: US 12,568,550 B2
(45) Date of Patent: Mar. 3, 2026

(54) METHOD AND DEVICE FOR PAGING IN SIDELINK COMMUNICATION BASED ON DRX

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Gene Back Hahn, Hwaseong-si (KR); Hyuk Min Son, Iksan-si (KR)

(73) Assignees: HYUNDAI MOTOR COMPANY, Seoul (KR); Kia Corporation, Seoul (KR); WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 545 days.

(21) Appl. No.: 17/923,043

(22) PCT Filed: May 4, 2021

(86) PCT No.: PCT/KR2021/005607
§ 371 (c)(1),
(2) Date: Nov. 3, 2022

(87) PCT Pub. No.: WO2021/230556
PCT Pub. Date: Nov. 18, 2021

(65) Prior Publication Data
US 2023/0164873 A1 May 25, 2023

Related U.S. Application Data

(60) Provisional application No. 63/025,269, filed on May 15, 2020.

(30) Foreign Application Priority Data

May 3, 2021 (KR) ........................ 10-2021-0057529

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0216* (2013.01); *H04W 52/0229* (2013.01);
(Continued)

(58) Field of Classification Search
CPC ..... H04W 76/28; H04W 76/14; H04W 88/04; H04W 4/40; H04W 52/0216;
(Continued)

(56) References Cited

U.S. PATENT DOCUMENTS

| | | | |
|---|---|---|---|
| 2015/0111586 A1 | 4/2015 | Sorrentino et al. | |
| 2016/0174269 A1* | 6/2016 | Lei ........................ | H04W 48/16 |
| | | | 455/515 |

(Continued)

FOREIGN PATENT DOCUMENTS

| | | |
|---|---|---|
| CN | 111148152 A | 5/2020 |
| CN | 111148191 A | 5/2020 |

(Continued)

OTHER PUBLICATIONS

International Search Report dated Aug. 24, 2021 issued in International Patent Application No. PCT/KR2021/005607 (with English translation).
(Continued)

*Primary Examiner* — Michael K Phillips
(74) *Attorney, Agent, or Firm* — MORGAN, LEWIS & BOCKIUS LLP

(57) ABSTRACT
Disclosed are a method and device for sidelink communication based on DRX. A method for operating a transmission
(Continued)

terminal comprises the steps of: receiving PHY DRX configuration information from a base station; generating a wakeup signal on the basis of sequence information included in the PHY DRX configuration information; and transmitting the wakeup signal to a reception terminal in a resource region indicated by resource information included in the PHY DRX configuration information.

16 Claims, 13 Drawing Sheets

(51) Int. Cl.
| | | |
|---|---|---|
| *H04W 76/14* | (2018.01) | |
| *H04W 88/04* | (2009.01) | |
| *H04W 92/18* | (2009.01) | |

(52) U.S. Cl.
CPC ............ *H04W 76/14* (2018.02); *H04W 88/04* (2013.01); *H04W 92/18* (2013.01)

(58) Field of Classification Search
CPC ........... H04W 52/0229; H04W 52/028; H04W 92/18; Y02D 30/70
See application file for complete search history.

(56) References Cited

U.S. PATENT DOCUMENTS

| | | | | |
|---|---|---|---|---|
| 2016/0286603 | A1 | 9/2016 | Vajapeyam et al. | |
| 2018/0220288 | A1* | 8/2018 | Agiwal | H04W 8/005 |
| 2018/0234919 | A1* | 8/2018 | Tsuda | H04W 88/04 |
| 2018/0317163 | A1* | 11/2018 | Lee | H04W 4/70 |
| 2020/0053647 | A1 | 2/2020 | Chae et al. | |
| 2020/0120604 | A1* | 4/2020 | Nam | H04W 52/028 |
| 2020/0145921 | A1 | 5/2020 | Zhang et al. | |
| 2020/0154355 | A1 | 5/2020 | Nam et al. | |
| 2021/0058866 | A1* | 2/2021 | Hosseini | H04B 7/0413 |
| 2021/0267009 | A1* | 8/2021 | Van Phan | H04W 76/14 |
| 2022/0159574 | A1* | 5/2022 | Islam | H04W 52/0229 |
| 2022/0264464 | A1* | 8/2022 | Seo | H04L 5/0053 |
| 2022/0338174 | A1* | 10/2022 | Zhao | H04L 1/0026 |
| 2022/0346081 | A1* | 10/2022 | Luo | H04W 72/20 |
| 2022/0353815 | A1* | 11/2022 | Lin | H04W 52/0232 |
| 2022/0385409 | A1* | 12/2022 | Park | H04W 4/40 |
| 2023/0063472 | A1* | 3/2023 | Freda | H04W 52/0274 |
| 2023/0064488 | A1* | 3/2023 | Han | H04W 76/28 |
| 2023/0088615 | A1* | 3/2023 | Zhao | H04W 4/06 370/311 |
| 2023/0189147 | A1* | 6/2023 | Bala | H04W 68/02 370/311 |
| 2023/0189388 | A1* | 6/2023 | Yu | H04W 76/40 370/329 |
| 2023/0337140 | A1* | 10/2023 | Miao | H04L 5/0053 |

FOREIGN PATENT DOCUMENTS

| | | |
|---|---|---|
| EP | 3 500 028 A1 | 6/2019 |
| JP | 2016-521048 A | 7/2016 |
| KR | 10-2017-0132163 A | 12/2017 |
| WO | 2017/196611 A1 | 11/2017 |
| WO | 2018/064477 A1 | 4/2018 |
| WO | 2018/175760 A1 | 9/2018 |
| WO | 2018/199652 A1 | 11/2018 |
| WO | 2020/020277 A1 | 1/2020 |
| WO | 2020/064710 A1 | 4/2020 |

OTHER PUBLICATIONS

"Remaining aspects of PDCCH-based power saving singal," R1-1910233, 3GPP TSG RAN WG1 #9 8bis, China, Oct. 4, 2019 (See p. 5, table 2).

"NR Sidelink enhancement," 3GPP TSG RAN Meeting #86, Spain, Dec. 9-12, 2019, Rp-193231.

Office Action issued in corresponding Chinese Patent Application No. 202180035251.1 dated Mar. 19, 2025, with English translation.

"Discussion on sidelink power control", 3GPP TSG RAN1 Meeting #89, Hangzhou, China, May 15-19, 2017, Document No. R1-1707036, 3 pages.

\* cited by examiner

【FIG. 1】
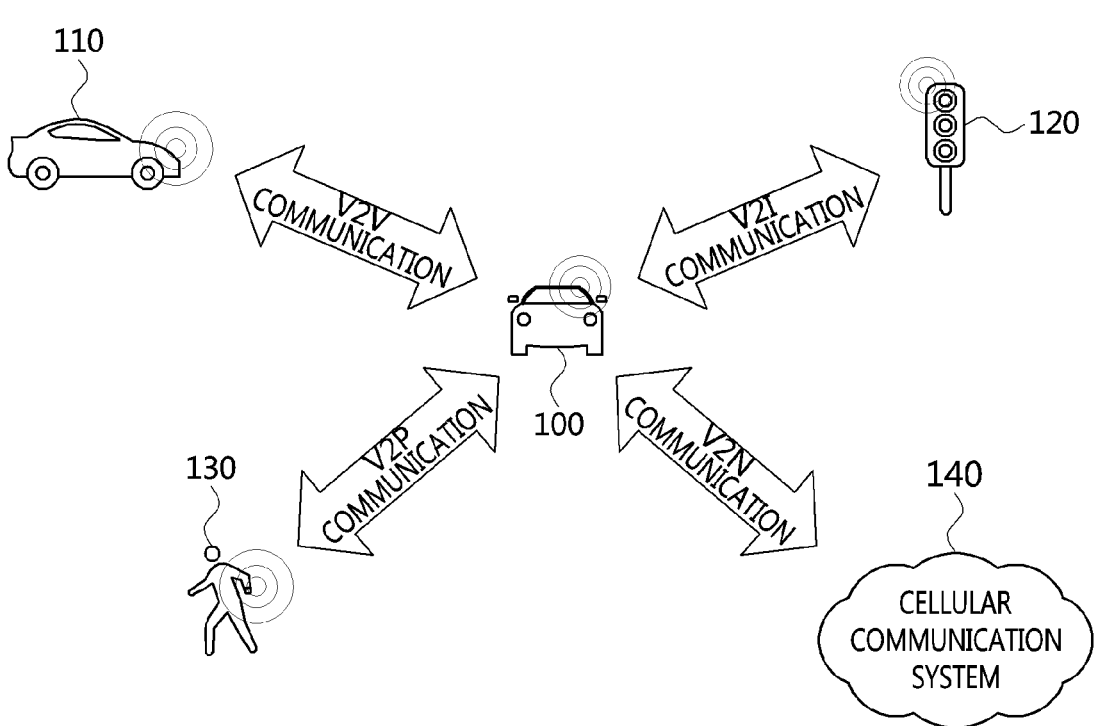

[FIG. 2]
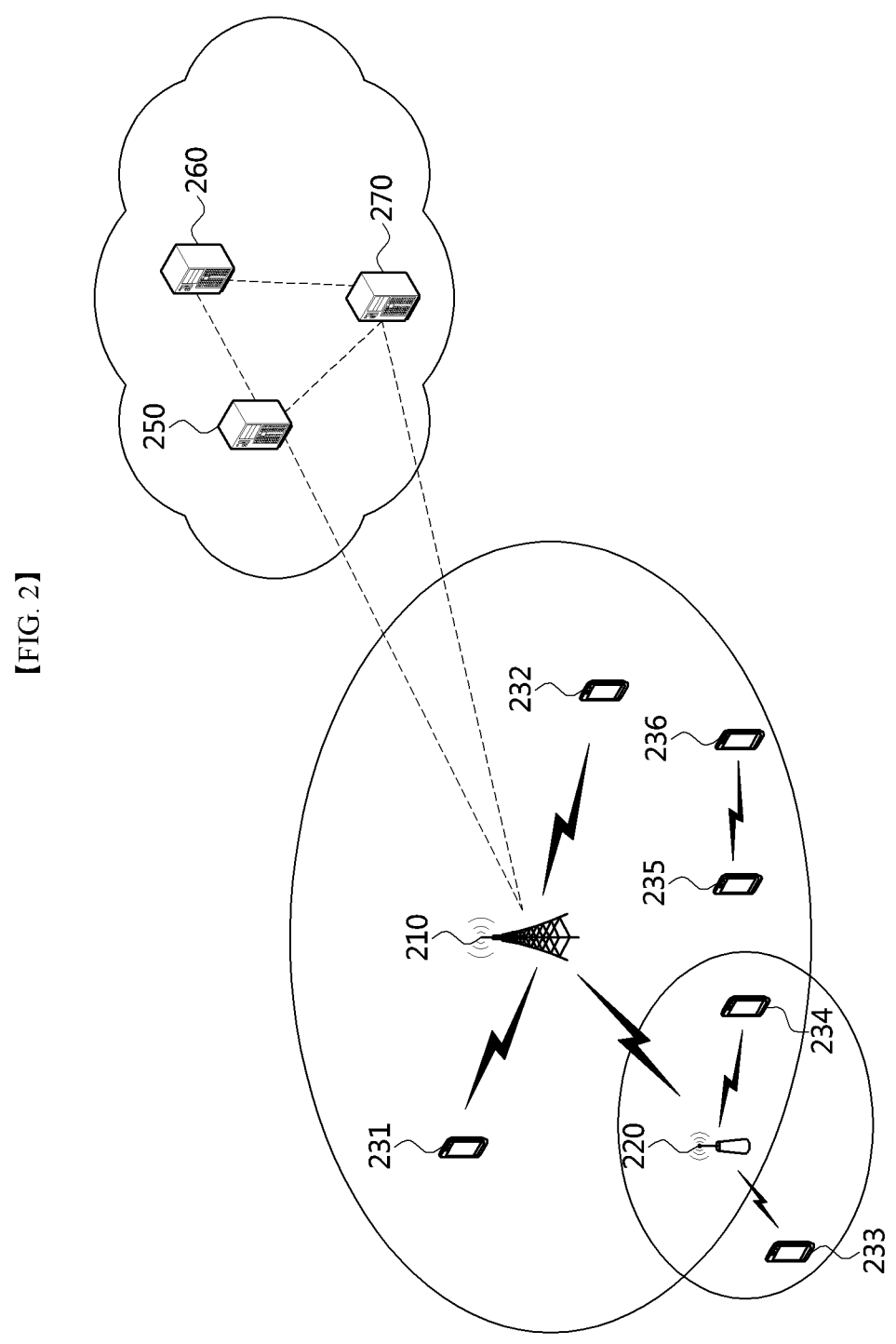

【FIG. 3】
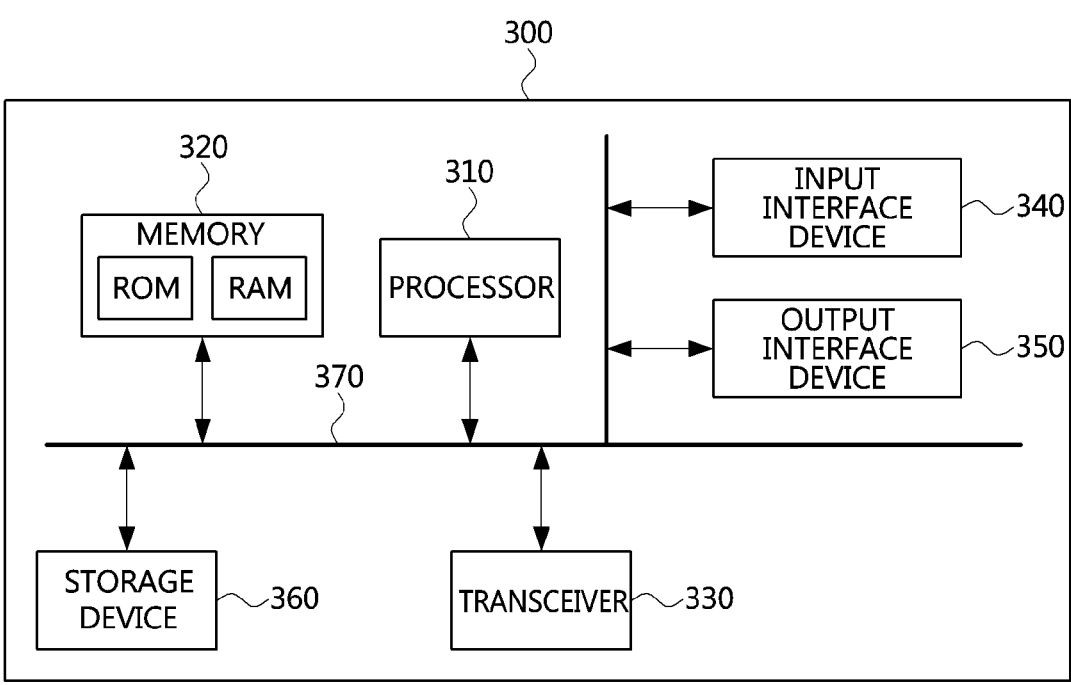
【FIG. 4】
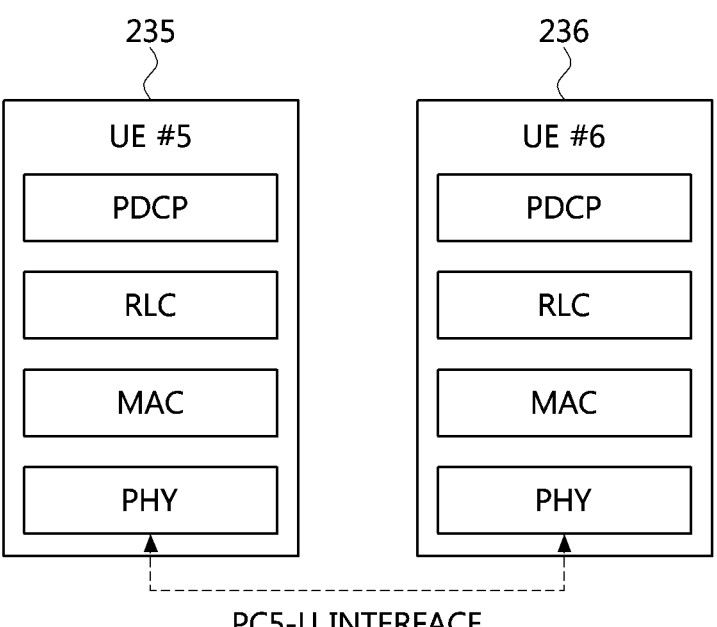

【FIG. 5】
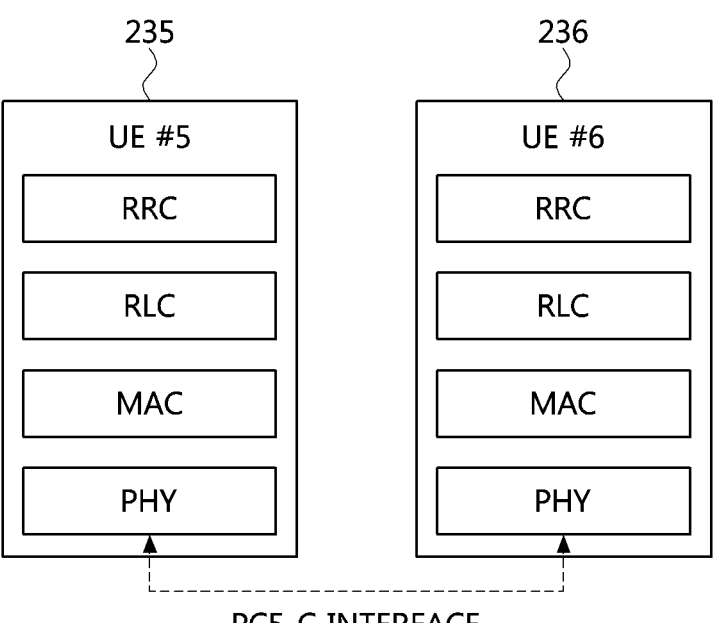
【FIG. 6】
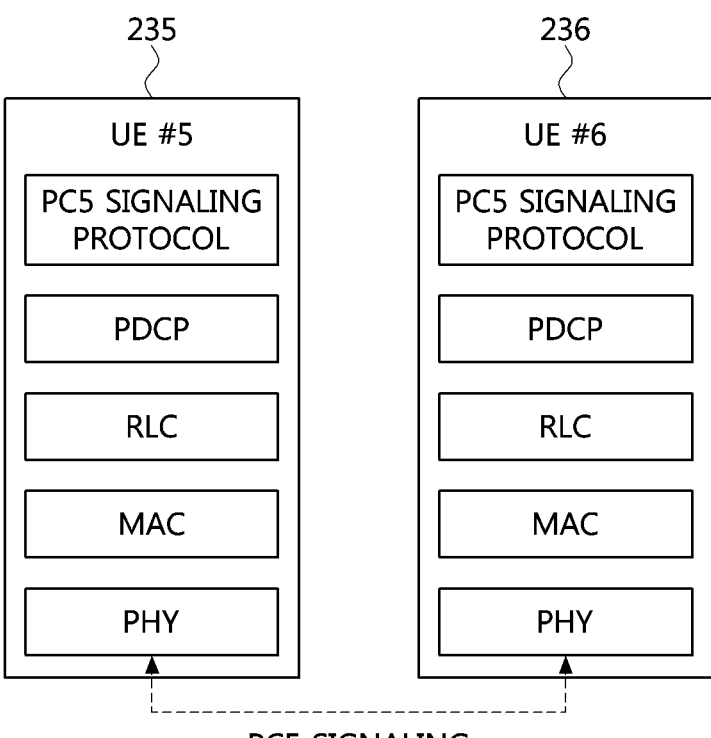

【FIG. 7】
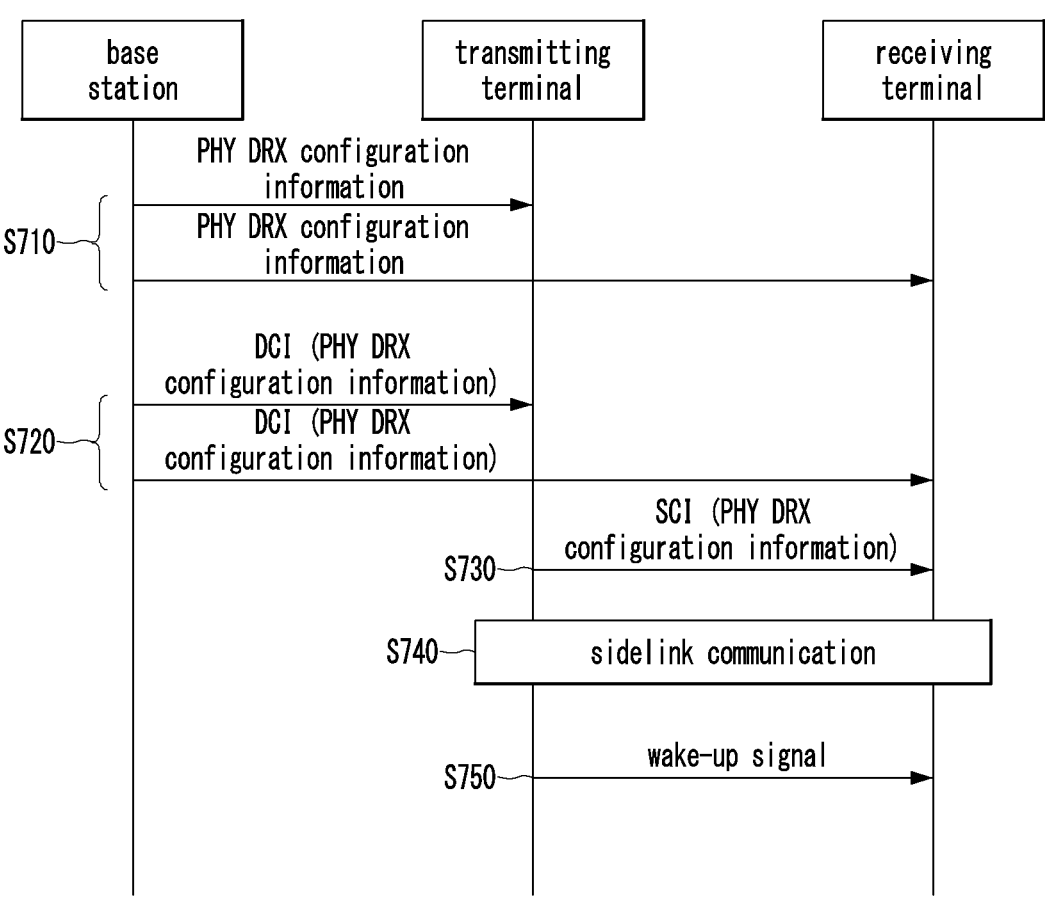

【FIG. 8】
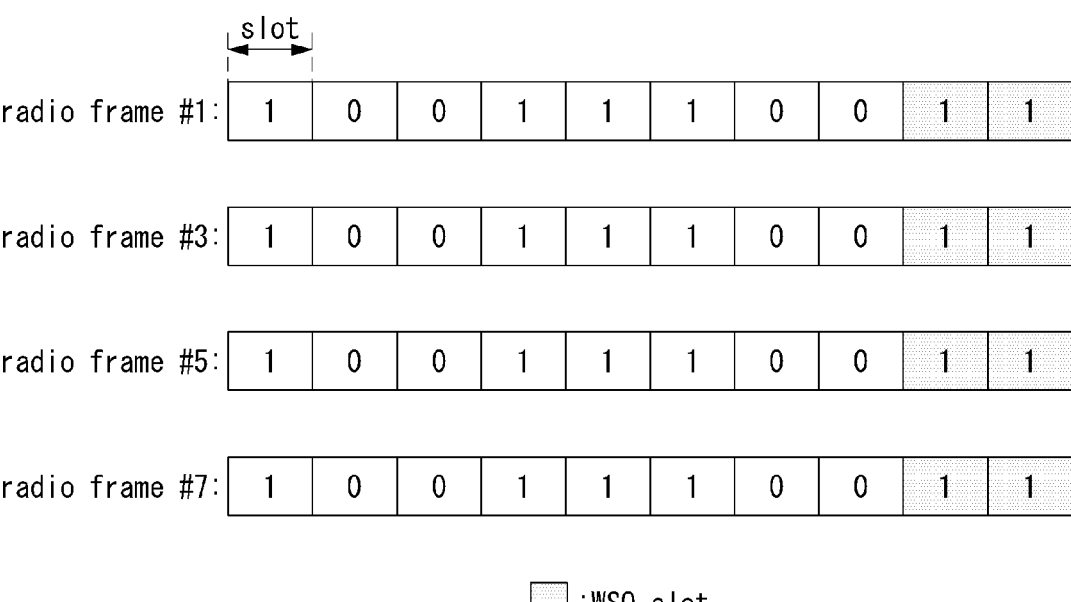
【FIG. 9】

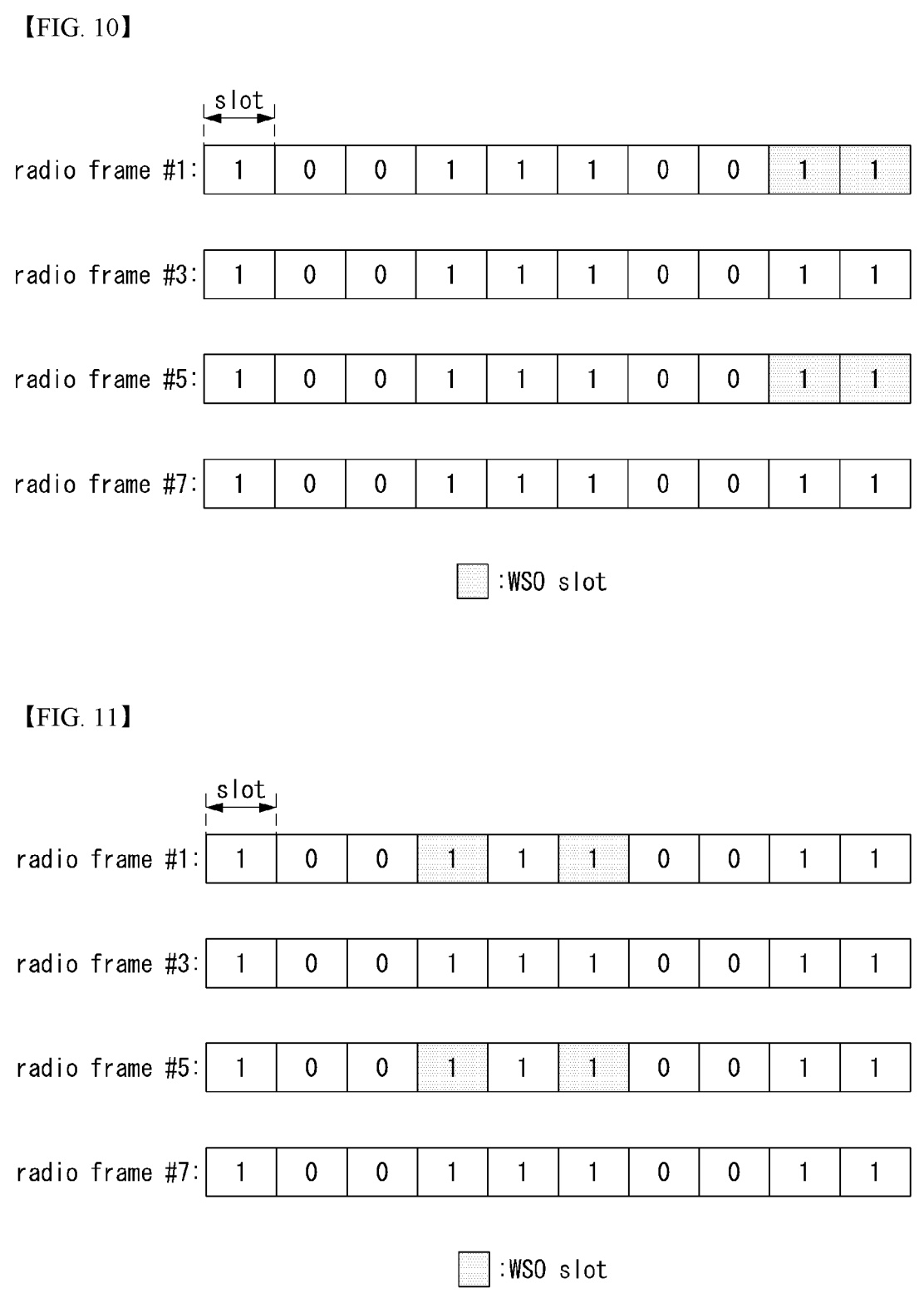

【FIG. 10】

| | slot | | | | | | | | | |
|---|---|---|---|---|---|---|---|---|---|---|
| radio frame #1: | 1 | 0 | 0 | 1 | 1 | 1 | 0 | 0 | 1 | 1 |
| radio frame #3: | 1 | 0 | 0 | 1 | 1 | 1 | 0 | 0 | 1 | 1 |
| radio frame #5: | 1 | 0 | 0 | 1 | 1 | 1 | 0 | 0 | 1 | 1 |
| radio frame #7: | 1 | 0 | 0 | 1 | 1 | 1 | 0 | 0 | 1 | 1 |

☐ :WSO slot

【FIG. 11】

| | slot | | | | | | | | | |
|---|---|---|---|---|---|---|---|---|---|---|
| radio frame #1: | 1 | 0 | 0 | 1 | 1 | 1 | 0 | 0 | 1 | 1 |
| radio frame #3: | 1 | 0 | 0 | 1 | 1 | 1 | 0 | 0 | 1 | 1 |
| radio frame #5: | 1 | 0 | 0 | 1 | 1 | 1 | 0 | 0 | 1 | 1 |
| radio frame #7: | 1 | 0 | 0 | 1 | 1 | 1 | 0 | 0 | 1 | 1 |

☐ :WSO slot

【FIG. 12】
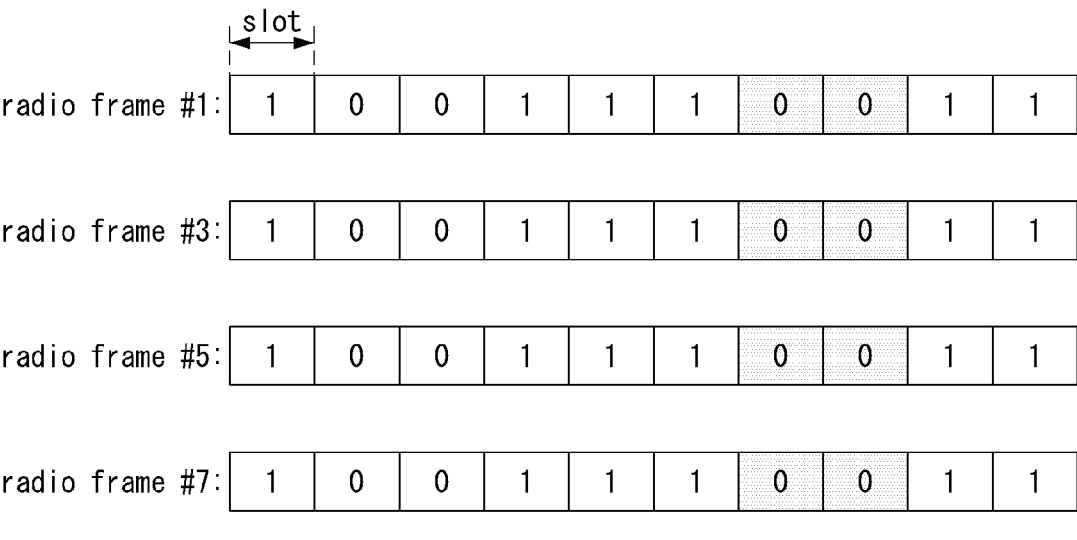
:WSO slot
【FIG. 13】
Scheme 1:
| 0 | 0 | 0 | 0 | 0 | 0 | 1 | 1 | 0 | 0 |
|---|---|---|---|---|---|---|---|---|---|
Scheme 2:
| 0 | 0 | 1 | 1 |
|---|---|---|---|

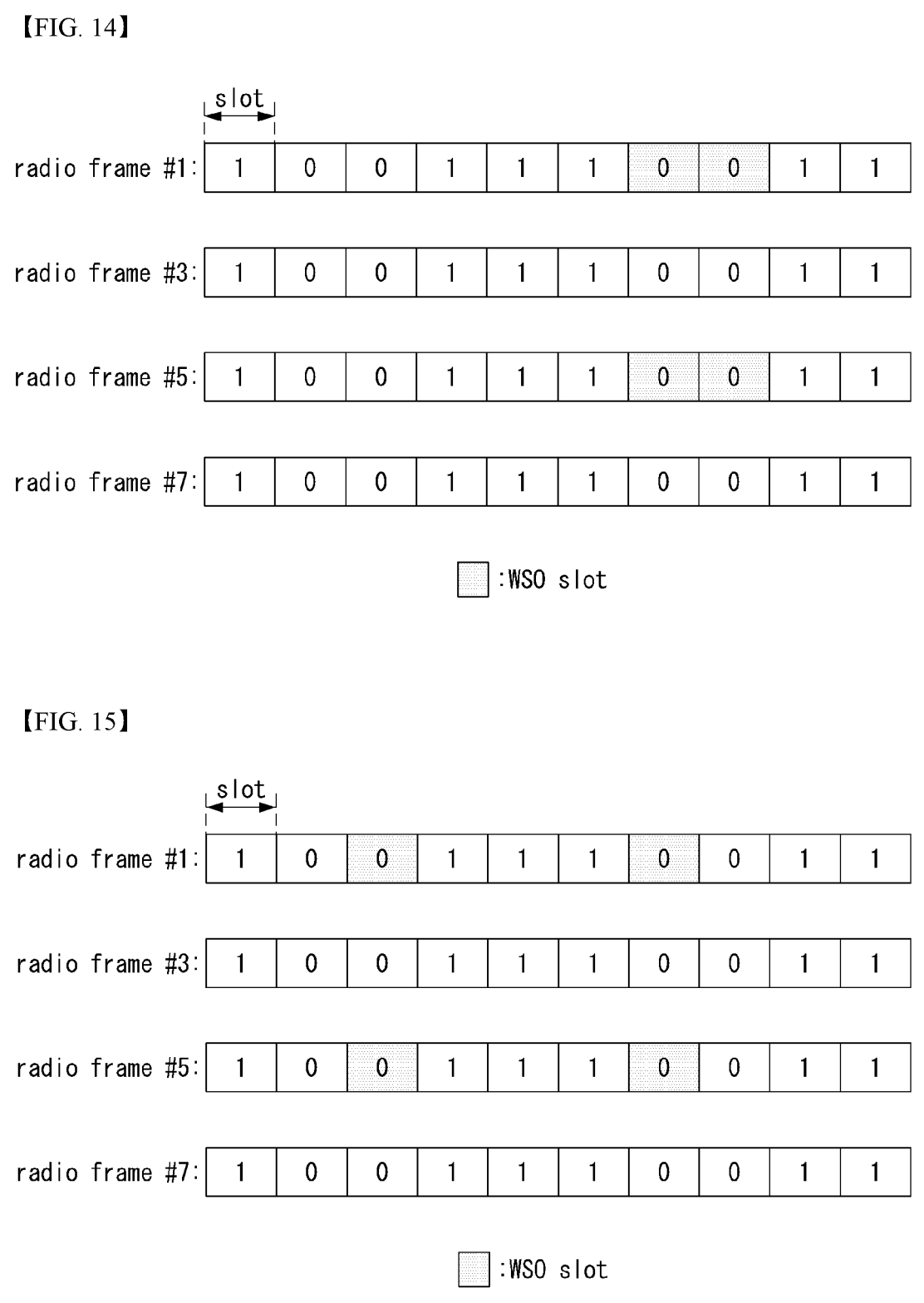

【FIG. 14】

| slot | | | | | | | | | |
|---|---|---|---|---|---|---|---|---|---| radio frame #1:

| 1 | 0 | 0 | 1 | 1 | 1 | 0 | 0 | 1 | 1 |
|---|---|---|---|---|---|---|---|---|---| radio frame #3:

| 1 | 0 | 0 | 1 | 1 | 1 | 0 | 0 | 1 | 1 |
|---|---|---|---|---|---|---|---|---|---| radio frame #5:

| 1 | 0 | 0 | 1 | 1 | 1 | 0 | 0 | 1 | 1 |
|---|---|---|---|---|---|---|---|---|---| radio frame #7:

| 1 | 0 | 0 | 1 | 1 | 1 | 0 | 0 | 1 | 1 |
|---|---|---|---|---|---|---|---|---|---|

:WSO slot

【FIG. 15】

| slot | | | | | | | | | |
|---|---|---|---|---|---|---|---|---|---| radio frame #1:

| 1 | 0 | 0 | 1 | 1 | 1 | 0 | 0 | 1 | 1 |
|---|---|---|---|---|---|---|---|---|---| radio frame #3:

| 1 | 0 | 0 | 1 | 1 | 1 | 0 | 0 | 1 | 1 |
|---|---|---|---|---|---|---|---|---|---| radio frame #5:

| 1 | 0 | 0 | 1 | 1 | 1 | 0 | 0 | 1 | 1 |
|---|---|---|---|---|---|---|---|---|---| radio frame #7:

| 1 | 0 | 0 | 1 | 1 | 1 | 0 | 0 | 1 | 1 |
|---|---|---|---|---|---|---|---|---|---|

:WSO slot

【FIG. 16】
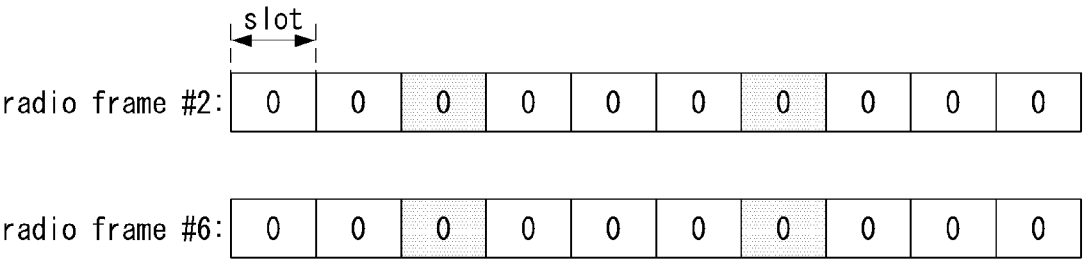
radio frame #2: | 0 | 0 | 0 | 0 | 0 | 0 | 0 | 0 | 0 | 0 |
radio frame #6: | 0 | 0 | 0 | 0 | 0 | 0 | 0 | 0 | 0 | 0 |
:WSO slot
【FIG. 17】
region #1: | 1 | 0 | 1 | 1 | 0 | 0 | 1 | 1 | 0 | 0 |
region #2: | 0 | 0 | 1 | 0 | 0 | 1 | 1 | 0 | 1 | 1 |
region #3: | 0 | 1 | 1 | 1 | 1 | 0 | 1 | 0 | 0 | 0 |
:WSO slot

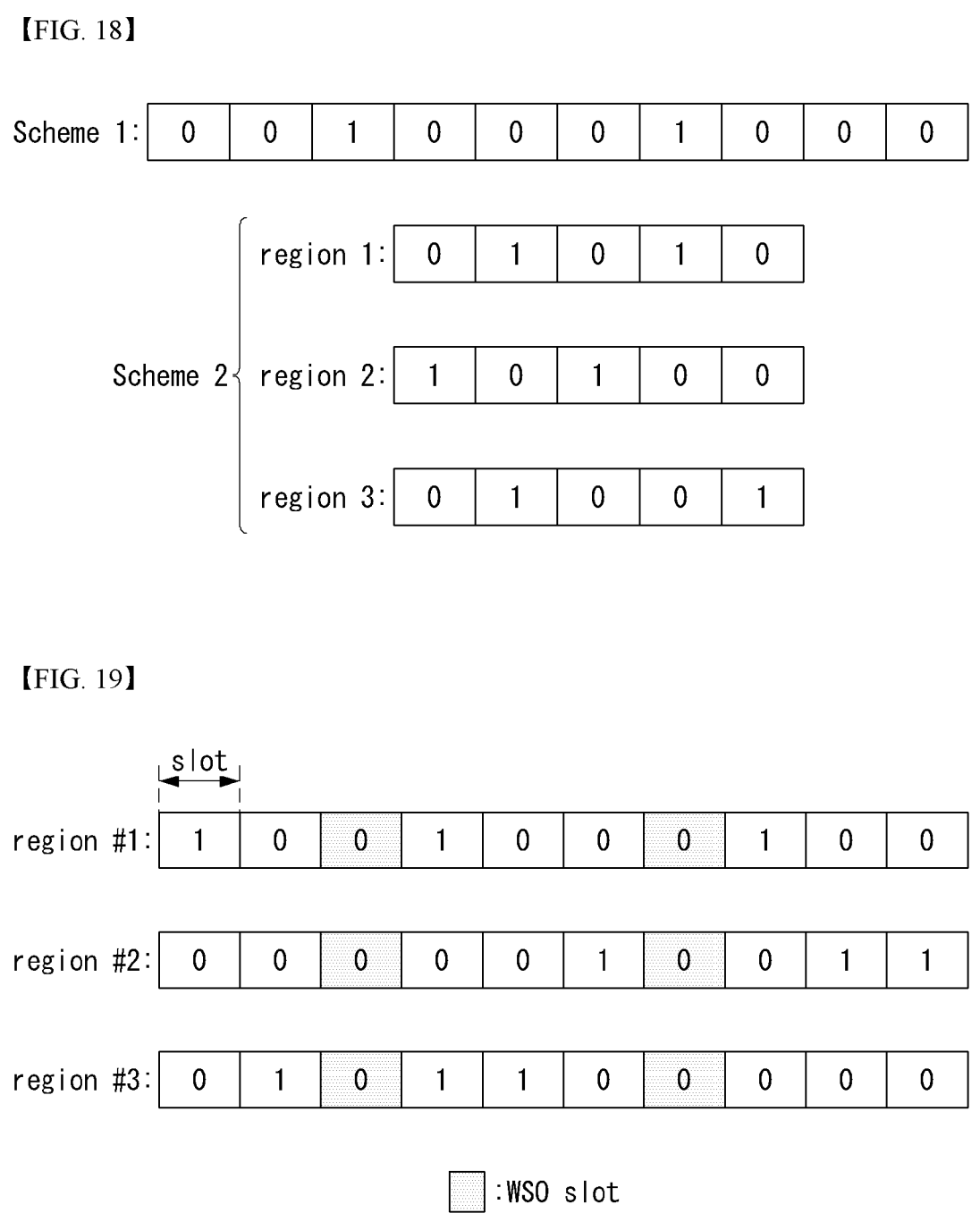

【FIG. 18】

Scheme 1: | 0 | 0 | 1 | 0 | 0 | 0 | 1 | 0 | 0 | 0 |

Scheme 2:

region 1: | 0 | 1 | 0 | 1 | 0 | region 2: | 1 | 0 | 1 | 0 | 0 | region 3: | 0 | 1 | 0 | 0 | 1 |

【FIG. 19】 slot region #1: | 1 | 0 | 0 | 1 | 0 | 0 | 0 | 1 | 0 | 0 | region #2: | 0 | 0 | 0 | 0 | 0 | 1 | 0 | 0 | 1 | 1 | region #3: | 0 | 1 | 0 | 1 | 1 | 0 | 0 | 0 | 0 | 0 |

☐ :WSO slot

【FIG. 20】
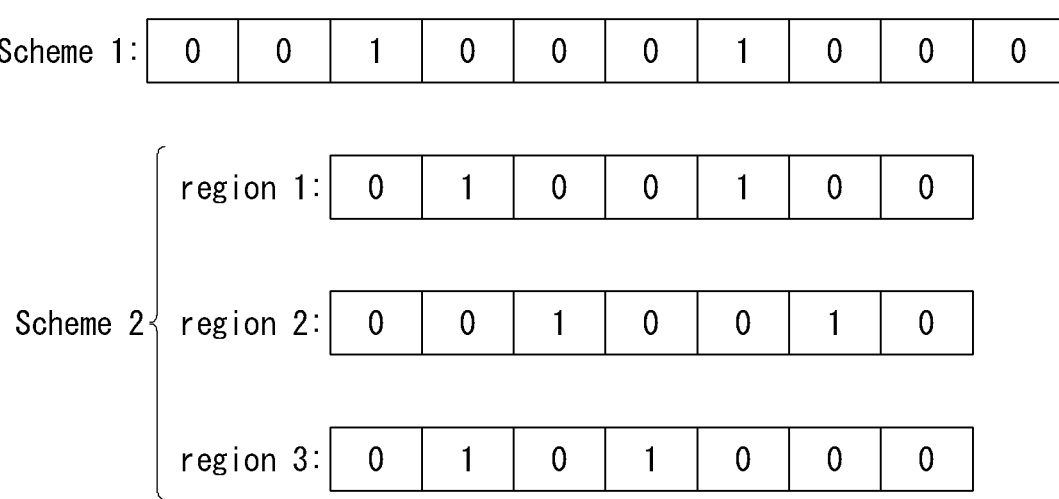

[FIG. 21]

| PSBCH | S-PSS | S-PSS | S-SSS | S-SSS | PSBCH | PSBCH | PSBCH | PSBCH | PSBCH | PSBCH | PSBCH | PSBCH | gap |

METHOD AND DEVICE FOR PAGING IN SIDELINK COMMUNICATION BASED ON DRX

CROSS-REFERENCE OF RELATED APPLICATIONS

This application is the U.S. National Phase under 35 U.S.C. § 371 of International Patent Application No. PCT/KR2021/005607, filed on May 4, 2021, which in turn claims the benefit of U.S. Provisional Patent Application No. 63/025,269, filed on May 15, 2020 and Korean Patent Application No. 10-2021-0057529, filed on May 3, 2021, the entire disclosures of which applications are incorporated by reference herein.

TECHNICAL FIELD

The present disclosure relates to a sidelink communication technique, and more particularly, to a technique for sidelink supporting discontinuous reception (DRX) operations in sidelink communication.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, in sidelink communication, a terminal may support discontinuous reception (DRX) operations. In this case, methods for transmitting and receiving sidelink data to and from the terminal supporting DRX operations are required.

DISCLOSURE

Technical Problem

An objective of the present disclosure for solving the above-described problem is to provide a method and an apparatus for supporting DRX operations in sidelink communication.

Technical Solution

An operation method of a transmitting terminal, according to a first exemplary embodiment of the present disclosure for achieving the objective, may comprise: receiving, from a base station, physical (PHY) discontinuous reception (DRX) configuration information; generating a wake-up signal based on sequence information included in the PHY DRX configuration information; and transmitting, to a receiving terminal, the wake-up signal in a resource region indicated by resource information included in the PHY DRX configuration information, wherein the wake-up signal is a PHY layer signal.

The sequence information may include a sequence used to identify the transmitting terminal among a plurality of transmitting terminals.

The sequence information may include a sequence and a cyclic shift value, and the wake-up signal may be generated by applying the cyclic shift value to the sequence.

The wake-up signal may be generated based on a synchronization signal block (SSB) sequence of the base station or a sidelink (S)-SSB sequence of the transmitting terminal.

The sequence information may include a sequence set configured for each cast type, the wake-up signal may be generated based on a sequence selected from the sequence set, and the cast type may be groupcast or unicast.

The wake-up signal may be transmitted within a resource region configured for transmission of an SSB of the base station or an S-SSB of the transmitting terminal.

The PHY DRX configuration information may further include information on a DRX cycle, and a reception operation of the wake-up signal may be performed by the receiving terminal according to the DRX cycle.

The DRX cycle may increase or decrease according to a number of failures to detect the wake-up signal in the receiving terminal.

The PHY DRX configuration information may further include information indicating that one fixed DRX cycle is used or information indicating that the DRX cycle is changed according to a preconfigured condition.

The DRX cycle may be set equal to an SSB periodicity of the base station or an S-SSB periodicity of the transmitting terminal.

An operation method of a receiving terminal, according to a second exemplary embodiment of the present disclosure for achieving the objective, may comprise: receiving physical (PHY) discontinuous reception (DRX) configuration information; operating according to a DRX cycle included in the PHY DRX configuration information; performing a monitoring operation to detect a wake-up signal in a resource region indicated by resource information included in the PHY DRX configuration information; and in response to detecting the wake-up signal, transitioning an operation mode of the receiving terminal from a sleep mode to a connected mode.

The PHY DRX configuration information may be received from a base station or a transmitting terminal.

The DRX cycle may increase or decrease according to a number of failures to detect the wake-up signal in the receiving terminal.

The PHY DRX configuration information may further include information indicating that one fixed DRX cycle is used or information indicating that the DRX cycle is changed according to a preconfigured condition.

The DRX cycle may be set equal to a synchronization signal block (SSB) periodicity of the base station or a sidelink (S)-SSB periodicity of the transmitting terminal.

The PHY DRX configuration information may further include sequence information, and the sequence information may be used to identify a transmitting terminal having transmitted the wake-up signal among a plurality of transmitting terminals.

The sequence information may include a sequence and a cyclic shift value, the wake-up signal may be generated by applying the cyclic shift value to the sequence, and the wake-up signal may be detected based on the sequence and the cyclic shift value.

The sequence information may include a sequence set configured for each cast type, the wake-up signal may be generated based on a sequence selected from the sequence set, and the cast type may be groupcast or unicast.

The wake-up signal may be generated based on an SSB sequence of the base station or an S-SSB sequence of the transmitting terminal, and the wake-up signal may be detected based on the SSB sequence or the S-SSB sequence.

A transmitting terminal, according to a third exemplary embodiment of the present disclosure for achieving the objective, may comprise: a processor; and a memory storing one or more instructions executable by the processor, wherein the one or more instructions are executed to: receive, from a base station, physical (PHY) discontinuous reception (DRX) configuration information; generate a wake-up signal based on sequence information included in the PHY DRX configuration information; and transmit, to a receiving terminal, the wake-up signal in a resource region indicated by resource information included in the PHY DRX configuration information, wherein the wake-up signal is a PHY layer signal.

Advantageous Effects

According to the present disclosure, a transmitting terminal may generate a wake-up signal based on a sequence and may transmit the wake-up signal to a receiving terminal in a wake-up signal occasion (WSO). The receiving terminal may operate according to a preset periodicity (e.g., DRX cycle). When the wake-up signal is received at the receiving terminal supporting DRX operations, the receiving terminal may perform transmission/reception of sidelink data with the transmitting terminal. Accordingly, the sidelink communication can be performed based on physical (PHY) DRX operations, and the performance of the communication system can be improved.

DESCRIPTION OF DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a sequence chart illustrating a first exemplary embodiment of a sidelink communication method based on PHY DRX operations.

FIG. 8 is a conceptual diagram illustrating a first exemplary embodiment of a WSO configuration method in a communication system.

FIG. 9 is a conceptual diagram illustrating a first exemplary embodiment of a WSO indication method in a communication system.

FIG. 10 is a conceptual diagram illustrating a second exemplary embodiment of a WSO configuration method in a communication system.

FIG. 11 is a conceptual diagram illustrating a third exemplary embodiment of a WSO configuration method in a communication system.

FIG. 12 is a conceptual diagram illustrating a fourth exemplary embodiment of a WSO configuration method in a communication system.

FIG. 13 is a conceptual diagram illustrating a second exemplary embodiment of a WSO indication method in a communication system.

FIG. 14 is a conceptual diagram illustrating a fifth exemplary embodiment of a WSO configuration method in a communication system.

FIG. 15 is a conceptual diagram illustrating a sixth exemplary embodiment of a WSO configuration method in a communication system.

FIG. 16 is a conceptual diagram illustrating a seventh exemplary embodiment of a WSO configuration method in a communication system.

FIG. 17 is a conceptual diagram illustrating an eighth exemplary embodiment of a WSO configuration method in a communication system.

FIG. 18 is a conceptual diagram illustrating a third exemplary embodiment of a WSO indication method in a communication system.

FIG. 19 is a conceptual diagram illustrating a ninth exemplary embodiment of a WSO configuration method in a communication system.

FIG. 20 is a conceptual diagram illustrating a fourth exemplary embodiment of a WSO indication method in a communication system.

FIG. 21 is a conceptual diagram illustrating a first exemplary embodiment of a structure of an S-SSB when a normal cyclic prefix (CP) is used.

MODES OF THE INVENTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention. Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120. The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARM) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods based on discontinuous reception (DRX) operations will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, in sidelink communication (e.g., V2X communication), terminal(s) may perform discontinuous reception (DRX) operations to save power. When the existing paging operation is applied to a sidelink, problems of increased delay and/or increased power consumption may occur due to higher layer signaling for the paging operation. In order to solve this problem, DRX operations supported by a PHY layer (hereinafter, referred to as 'PHY DRX operations') may be required. In order to support PHY DRX operations, an operation of a terminal according to a DRX cycle may need to be defined.

A terminal operating in a sleep mode may operate according to a DRX cycle. The sleep mode may be an RRC idle state or an RRC inactive state. The terminal may not perform an operation of receiving a wake-up signal for an off-duration according to a DRX cycle, and may perform an operation of receiving a wake-up signal for an on-duration according to the DRX cycle. The operation of receiving a wake-up signal may mean a monitoring operation for reception of the wake-up signal. The wake-up signal may be used to transition the sleep mode to a connected mode. The connected mode may mean a state in which sidelink communication (e.g., a transmission operation of sidelink data) can be performed. For example, the connected mode may mean an RRC connected state. The wake-up signal may be a PHY layer signal. That is, the wake-up signal may be generated by a PHY layer of a transmitting terminal and may be detected by a PHY layer of a receiving terminal.

In exemplary embodiments, the PHY DRX operation may be applied to communication between a base station and a transmitting terminal, communication between a transmitting terminal and a receiving terminal, and/or communication between a base station and a receiving terminal. Here, the transmitting terminal may be a terminal transmitting sidelink (SL) data in sidelink communication, and the receiving terminal may be a terminal receiving the SL data in sidelink communication. The transmitting terminal may transmit a wake-up signal to the receiving terminal. A wake-up signal may also be transmitted by the base station. The receiving terminal may operate in the sleep mode. The receiving terminal operating in the sleep mode may perform a reception operation of a wake-up signal for an on-duration according to a DRX cycle. Upon receiving a wake-up signal from the transmitting terminal and/or the base station, the operation mode of the receiving terminal may be transitioned from the sleep mode to the connected mode. The transmitting terminal may operate in the sleep mode. The transmitting terminal operating in the sleep mode may perform a reception operation of a wake-up signal for an on-duration according to a DRX cycle. Upon receiving a wake-up signal from the base station, the operation mode of the transmitting terminal may be transitioned from the sleep mode to the connected mode.

FIG. 7 is a sequence chart illustrating a first exemplary embodiment of a sidelink communication method based on PHY DRX operations.

As shown in FIG. 7, a communication system may include a base station, a transmitting terminal, and a receiving terminal. The base station may be the base station 210 shown in FIG. 2, the transmitting terminal may be the UE 235 shown in FIG. 2, and the receiving terminal may be the UE 236 shown in FIG. 2. Each of the base station, transmitting terminal, and receiving terminal may be configured identically or similarly to the communication node 300 shown in FIG. 3. The transmitting terminal and receiving terminal may support the protocol stack(s) shown in FIGS. 4 to 6.

The base station may generate PHY DRX configuration information and may transmit the PHY DRX configuration information (S710). In step S710, the PHY DRX configuration information may be transmitted by one or a combination of two or more of system information, RRC message, and MAC CE. The PHY DRX configuration information may be configuration information for DRX operations in a sidelink. The PHY DRX configuration information may include information on one or more of a DRX cycle, a start time of the DRX cycle, an on-duration according to the DRX cycle, an off-duration according to the DRX cycle, and configuration information of a wake-up signal (e.g., sequence, cyclic shift, root value, mapping information), and/or transmission resource (e.g., wake-up signal occasion (WSO)) information of a wake-up signal. In step S710, the transmitting terminal and/or the receiving terminal may receive the PHY DRX configuration information from the base station.

A portion of the PHY DRX configuration information may be transmitted through a PHY signaling message (e.g., DCI and/or SCI). For example, the base station may transmit DCI (e.g., DCI format 3_X) including the PHY DRX configuration information to the transmitting terminal and/or the receiving terminal (S720). X may be an integer. In step S720, the transmitting terminal and/or the receiving terminal may obtain the PHY DRX configuration information by receiving the DCI from the base station. Step S720 may be performed when the sidelink communication supports the mode 1 (e.g., sidelink TM 1 or 3 defined in Table 2). The transmitting terminal may transmit SCI (e.g., first-stage SCI and/or second-stage SCI) including the PHY DRX configuration information to the receiving terminal (S730). In step S730, the receiving terminal may obtain the PHY DRX configuration information by receiving the SCI from the transmitting terminal. Step S730 may be performed when the sidelink communication supports the mode 1 (e.g., sidelink TM 1 or TM 3 defined in Table 2) or the mode 2 (e.g., sidelink TM 2 or 4 defined in Table 2).

In step S740, sidelink communication between the transmitting terminal and the receiving terminal may be performed. The receiving terminal may support PHY DRX operations. For example, the receiving terminal may enter the sleep mode when the sidelink communication is terminated (e.g., after a preset time from an end time of the sidelink communication). The receiving terminal entering the sleep mode may not perform a wake-up signal reception operation in an off-duration according to a DRX cycle and may perform a wake-up signal reception operation in an on-duration according to the DRX cycle. When communication with the receiving terminal is required, the transmitting terminal may transmit a wake-up signal to the receiving terminal in consideration of the DRX cycle of the receiving terminal (S750). The wake-up signal may be generated based on the information element(s) (e.g., sequence, cyclic shift, root value, mapping relationship between SSB (or sidelink (S)-SSB) and sequence, etc.) included in the PHY DRX configuration information. The wake-up signal may be transmitted in a resource region (e.g., WSO) indicated by the information element(s) included in the PHY DRX configuration information. The WSO may be configured in consideration of the DRX cycle. For example, the WSO may be configured in an on-duration according to the DRX cycle. All or some resources of the on-duration may be configured as the WSO.

The receiving terminal may perform a monitoring operation on a preconfigured resource (e.g., WSO) to receive a wake-up signal in the on-duration according to the DRX cycle. Upon receiving a wake-up signal, the operation mode of the receiving terminal may be transitioned from the sleep mode to the connected mode, and the receiving terminal operating in the connected mode may perform communication (e.g., sidelink communication) with the transmitting terminal.

1. Operation Mode Transition Operation and Wake-Up Signal Transmission/Reception Operation The terminal (e.g., transmitting terminal and/or receiving terminal) may operate in the sleep mode after a preset time (hereinafter, referred to as 'T1') from a reception time of data (e.g., the last data). When sidelink communication is not performed for the preset time from the reception time of data, the terminal may enter the sleep mode. In exemplary embodiments, the terminal may refer to the transmitting terminal or the receiving terminal shown in FIG. 7. Alternatively, the operation of the terminal may also be interpreted as the operation of the base station shown in FIG. 7. T1 may be set by steps S710, S720, and/or S730 shown in FIG. 7. For example, T1 may be included in system information. Alternatively, T1 may be transmitted on a PSBCH. In exemplary embodiments, a value set by a system may mean a value (e.g., information) transmitted through system information and/or PSBCH.

The terminal entering the sleep mode may operate according to a DRX cycle. The DRX cycle may be set by step S710, step S720, and/or step S730. The DRX cycle may be set as shown in Table 3 below.

TABLE 3

| DRX cycle | Value |
|-----------|-------|
| DRX cycle #1 | X milliseconds (ms) |
| DRX cycle #2 | Y ms |
| DRX cycle #3 | Z ms |

Each of X, Y, and Z may be a natural number. It may be assumed that a relationship 'X<Y<Z' is established. In this case, among the DRX cycles, the DRX cycle #1 may have the shortest periodicity, and the DRX cycle #3 may have the longest periodicity. Alternatively, it may be assumed that a relationship 'X>Y>Z' is established. In this case, among the DRX cycles, the DRX cycle #1 may have the longest periodicity, and the DRX cycle #3 may have the shortest periodicity. A terminal operating in the sleep mode (e.g., a terminal entering the sleep mode for the first time) may operate according to the DRX cycle #1.

If a wake-up signal is not received (e.g., detected) in an on-duration according to the DRX cycle #1, the terminal may operate according to the DRX cycle #2. That is, the DRX cycle used by the terminal may be changed from the DRX cycle #1 to the DRX cycle #2. The terminal may operate according to the DRX cycle #2.

If a wake-up signal is not received (e.g., detected) in an on-duration according to the DRX cycle #2, the terminal may operate according to the DRX cycle #3. That is, the DRX cycle used by the terminal may be changed from the DRX cycle #2 to the DRX cycle #3. The terminal may operate according to the DRX cycle #3. If a wake-up signal is not received (e.g., detected) in an on-duration according to the DRX cycle #3, the terminal may maintain the DRX cycle #3.

If a wake-up signal is not received more than n times in an on-duration according to a DRX cycle, the DRX cycle may be changed. n may be a natural number. n may be the maximum number of failures to detect a wake-up signal (e.g., the maximum number of reception failures). n for each DRX cycle may be set as shown in Table 4 below. In each of the DRX cycles, n may be set differently.

TABLE 4

| DRX cycle | value | Maximum number n of wake-up signal detection failures |
|-----------|-------|-------------------------------------------------------|
| DRX cycle #1 | X ms | 2 |
| DRX cycle #2 | Y ms | 4 |
| DRX cycle #3 | Z ms | — |

If a wake-up signal is not received (e.g., detected) twice in the on-duration according to the DRX cycle #1, the DRX cycle used by the terminal may be changed from the DRX cycle #1 to the DRX cycle #2. If a wake-up signal is not received (e.g., detected) four times in the on-duration according to the DRX cycle #2, the DRX cycle used by the terminal may be changed from the DRX cycle #2 to the DRX cycle #3.

Although three DRX cycles are defined in Tables 3 and 4, the number of DRX cycles may be variously set. For example, when one DRX cycle is configured, the operation mode of the terminal may be transitioned according to one DRX cycle. The information defined in Tables 3 and 4 (e.g., the values of the DRX cycle and/or the maximum numbers of wake-up signal detection failures) may be set dynamically or semi-statically. For example, the information defined in Tables 3 and 4 may be configured by a higher layer message, MAC CE and/or PHY control information (e.g., PSBCH, DCI and/or SCI). The information defined in Tables 3 and 4 may be included in the PHY DRX configuration information.

The information defined in Tables 3 and 4 may be transmitted, configured, and/or operated during communication (e.g., sidelink communication). The transmitting terminal may transmit information indicating one DRX cycle among the DRX cycles defined in Table 3 to the receiving terminal, and the receiving terminal may operate according to the DRX cycle indicated by the transmitting terminal. During sidelink communication between the transmitting terminal and the receiving terminal, the transmitting terminal may transmit information indicating the DRX cycle #2 to the receiving terminal. In this case, the receiving terminal may operate according to the DRX cycle #2 indicated by the transmitting terminal. The transmitting terminal may indicate the DRX cycle to the terminal by using one or a combination of two or more of a higher layer message, MAC CE, and PHY control information.

The PHY DRX operation may be performed according to a DRX scheme 1 or a DRX scheme 2. When the DRX scheme 1 is used, the PHY DRX operation may be performed according to one fixed DRX cycle. When the DRX scheme 2 is used, the PHY DRX operation may be performed according to a plurality of DRX cycles. For example, one DRX cycle among the plurality of DRX cycles may be used, and the used DRX cycle may be changed according to specific condition(s). The transmitting terminal may transmit information indicating the DRX scheme 1 or DRX scheme 2 (e.g., indication information defined in Table 5) to the receiving terminal using a higher layer message, MAC CE, and/or PHY control information. The indication information may be set as shown in Table 5 below. The indication information may be included in the PHY DRX configuration information.

TABLE 5

| Indication information (e.g., indication bit) | DRX scheme |
|-----------------------------------------------|------------|
| First value | DRX scheme 1 |
| Second value | DRX scheme 2 |

Indication information set to a first value (e.g., 0) may indicate that the DRX scheme 1 is used, and indication information set to a second value (e.g., 1) may indicates that the DRX scheme 2 is used. The above-described DRX cycle may be set based on a periodicity for a paging operation in a Uu interface of the LTE communication system and/or the NR communication system. For example, the DRX cycle may be set to be the same as a periodicity for a paging operation in a Uu interface of the LTE communication system and/or the NR communication system.

In a step of setting the DRX cycles, a specific DRX cycle may be set. As shown in Table 6 below, the DRX cycle may be set to be associated (e.g., mapped) with an SSB periodicity (e.g., SSB transmission periodicity). Here, the SSB may be an SSB transmitted from the base station or a sidelink-synchronization signal block (S-SSB) transmitted from the transmitting terminal.

TABLE 6

| SSB periodicity | DRX cycle |
|---|---|
| SSB periodicity #1 | DRX cycle #1 |
| SSB periodicity #1 | DRX cycle #2 |
| SSB periodicity #1 | DRX cycle #3 |

The DRX cycle #1 may be mapped to the SSB periodicity #1, the DRX cycle #2 may be mapped to the SSB periodicity #2, and the DRX cycle #3 may be mapped to the SSB periodicity #3. "The DRX cycle is mapped to the SSB periodicity' may mean "the DRX cycle is the same as the SSB periodicity". The terminal may identify a DRX cycle based on a periodicity of an SSB received before operating in the sleep mode. Thereafter, the terminal may operate in the sleep mode, and the terminal may operate according to the DRX cycle identified based on the periodicity of the SSB (e.g., the DRX cycle mapped to the SSB periodicity).

Based on Table 7 below, the SSB periodicity may be used as a default value of the DRX cycle, and when a wake-up signal is not received, the DRX cycle may be set to an integer multiple of the default value. Here, the SSB may be an SSB transmitted from the base station or an S-SSB transmitted from the transmitting terminal.

TABLE 7

| DRX cycle | Setting value of SSB periodicity |
|---|---|
| DRX cycle #1 | 1 |
| DRX cycle #2 | 2 |
| DRX cycle #3 | 3 |

The DRX cycle #1 may be 'SSB periodicity×1'. That is, the DRX cycle #1 may be a default periodicity and may be the same as the SSB periodicity. The DRX cycle #2 may be 'SSB periodicity×2', and the DRX cycle #3 may be 'SSB periodicity×3'. The terminal may change the DRX cycle according to the number of wake-up signal detection failures (e.g., the number of reception failures). The DRX cycle #1 (e.g., default DRX cycle) may be set to a value greater than or less than the SSB periodicity. Each of the DRX cycles #2 and #3 may be set in various ways based on the SSB periodicity.

The information defined in Tables 6 and 7 may be values set by the system. The information defined in Tables 6 and 7 may be configured by one or a combination of two or more of the upper layer message, MAC CE, and PHY control information. The information defined in Tables 6 and 7 may be transmitted/received in steps S710, S720, and/or S730 shown in FIG. 7. Based on the information defined in Tables 6 and 7, the terminal may perform a wake-up signal reception operation based on the SSB periodicity, and the wake-up signal reception operation may be performed after synchronization acquisition or synchronization correction.

In the exemplary embodiments of Tables 3 to 7, a time point at which reception of a wake-up signal is attempted may be a resource region in which the last wake-up signal within the configured DRX cycle can be transmitted/received. In this case, the region in which the wake-up signal can be transmitted/received may mean an on-duration region within the DRX cycle. Alternatively, the region in which the wake-up signal can be transmitted/received may be a region in which the first wake-up signal can be transmitted/received after one DRX cycle has expired. When a wake-up signal is not received, a time point at which the next DRX cycle starts may be a time point at which reception of a wake-up signal is attempted. Alternatively, independently of the corresponding reception time, the terminal (e.g., receiving terminal) may perform a DRX operation based on the DRX cycle set after the sleep mode.

2. Configuration of a Wake-Up Signal Transmission Time and Transmission Resource A wake-up signal may be transmitted in a resource region preconfigured within a resource pool. The resource pool may be classified into a TX resource pool and an RX resource pool. The TX resource pool and the RX resource pool may be identically configured. When the configuration of the TX resource pool is different from that of the RX resource pool, the resource pool in which the wake-up signal is transmitted may be interpreted as a TX resource pool, RX resource pool, or exceptional pool depending on a transmitting entity and/or receiving entity of the wake-up signal. The exceptional resource pool may be configured in common by the transmitting terminal and the receiving terminal. The exceptional resource pool may be referred to as a common resource pool.

When the base station transmits a wake-up signal to the transmitting terminal, the resource pool may be interpreted as a TX resource pool or an RX resource pool configured in the transmitting terminal. When the transmitting termina transmits a wake-up signal to the receiving terminal, the resource pool in which the wake-up signal is transmitted may be interpreted as an RX resource pool configured in the receiving terminal. When the base station transmits a wake-up signal to the receiving terminal, a resource region in which the wake-up signal can be transmitted may be configured based on an RX resource pool of the receiving terminal. When the TX/RX resource pools are configured identically between the transmitting terminal and the receiving terminal, the resource region in which the wake-up signal can be transmitted may be configured based on an exceptional resource pool commonly configured to the transmitting terminal and the receiving terminal. A resource region capable of transmitting a wake-up signal may be referred to as a wake-up signal occasion (WSO).

2-1. Scheme of Configuring a Specific Resource Region within a Resource Pool as a WSO FIG. 8 is a conceptual diagram illustrating a first exemplary embodiment of a WSO configuration method in a communication system.

As shown in FIG. 8, a bitmap may indicate whether a resource pool is configured in each of 10 slots. The bitmap used for configuring a resource pool may be referred to as a 'resource bitmap'. 10 slots configured by the resource bitmap may be contiguous slots or non-contiguous slots. The non-contiguous slots may be slots excluding slot(s) reserved for transmission of signals and/or channels among contiguous slots. A bit set to a first value (e.g., 0) in the resource bitmap may indicate that the resource pool is not configured in slot(s) mapped to the bit (e.g., the slot(s) does not belong to the resource pool), and a bit set to a second value (e.g., 1) in the resource bitmap may indicate that the resource pool is configured in slot(s) mapped to the bit (e.g., the slot(s)

belongs to the resource pool). Each bit included in the resource bitmap may be mapped to one slot or a plurality of slots. The resource bitmap may be applied based on a preset periodicity. When the preset periodicity is two radio frames, the resource bitmap may be applied to every two radio frames. The preset periodicity for the resource bitmap may be indicated by one or a combination of two or more of higher layer signaling, MAC signaling, and PHY signaling.

The resource bitmap may be set to [1 0 0 1 1 1 0 0 1 1], and may be applied to radio frames #1, #3, #5, #7, and the like. That is, since the same resource bitmap is applied to every two radio frames, the resource pool may be identically configured for every two radio frames. The WSO slot may be a slot capable of transmitting a wake-up signal. A configuration periodicity of the WSO (e.g., WSO slot) may be the same as a configuration periodicity of the resource pool.

FIG. 9 is a conceptual diagram illustrating a first exemplary embodiment of a WSO indication method in a communication system.

As shown in FIG. 9, a bitmap may indicate whether a WSO is configured in each of slots. The bitmap used for configuring the WSO may be referred to as a 'WSO bitmap'. The WSO bitmap may be configured based on Scheme 1 or Scheme 2. When Scheme 1 is used, the number of bits included in the WSO bitmap may be the same as the number of bits included in the resource bitmap. That is, a configuration unit of the WSO bitmap may be the same as a configuration unit of the resource bitmap. In this case, the WSO bitmap may indicate whether a WSO is configured in each of all slots (e.g., 10 slots) associated with the resource bitmap. According to Scheme 1, the WSO bitmap may be set to [0 0 0 0 0 0 0 0 1 1].

When Scheme 2 is used, the WSO bitmap may indicate whether a WSO is configured in each of slots (e.g., 6 slots) in which the resource pool is configured among all slots (e.g., 10 slots) associated with the resource bitmap. The slots in which the resource pool is configured may be indicated by the resource bitmap. According to Scheme 2, the WSO bitmap may be set to [0 0 0 0 1 1]. A bit set to a first value (e.g., 0) in the WSO bitmap may indicate that WSO(s) is not configured in slot(s) mapped to the bit, and a bit set to a second value (e.g., 1) in the WSO bitmap may indicate that WSO(s) is configured in slot(s) mapped to the bit. Each bit included in the WSO bitmap may be mapped to one slot or a plurality of slots.

A configuration periodicity of the WSO may be the same as a configuration periodicity of the resource pool. Alternatively, the configuration periodicity of the WSO may be different from the configuration periodicity of the resource pool. The configuration periodicity of the WSO may be indicated by one or a combination of two or more of higher layer signaling, MAC signaling, and PHY signaling. The WSO may be configured by a function instead of the WSO bitmap. Variables in the function for configuring WSO(s) may be a system frame index, radio frame index, configuration information of resource pool (e.g., resource bitmap), identifier (e.g., ID) of the receiving terminal, identifier of the transmitting terminal, group ID, cell ID, transmission periodicity of a wake-up signal (e.g., configuration periodicity of the WSO), and/or may be new variable(s) configured by higher layer signaling.

A radio frame capable of transmitting a wake-up signal may be indicated by a function based on various variables, and a slot capable of transmitting the wake-up signal within the corresponding radio frame may be indicated by a WSO bitmap. Alternatively, both a radio frame and a slot capable of transmitting a wake-up signal may be indicated by a function. Alternatively, a radio frame capable of transmitting a wake-up signal may be indicated by a bitmap, and a slot capable of transmitting the wake-up signal within the corresponding radio frame may be indicated by a function.

FIG. 10 is a conceptual diagram illustrating a second exemplary embodiment of a WSO configuration method in a communication system.

As shown in FIG. 10, a configuration periodicity of a WSO (e.g., WSO slot) may be different from a configuration periodicity of a resource pool. The WSO may be configured every four radio frames, and the resource pool may be configured every two radio frames. The periodicity of the WSO may be set in units of radio frames or n slots. Here, n may be a natural number. A bitmap (e.g., resource bitmap and/or WSO bitmap) may be configured in units of n slots. The unit of the n slots may be configured to be the same as a configuration unit of the resource pool. Alternatively, the unit of the n slots may be configured differently from the configuration unit of the resource pool.

FIG. 11 is a conceptual diagram illustrating a third exemplary embodiment of a WSO configuration method in a communication system.

As shown in FIG. 11, WSOs (e.g., WSO slots) may be configured non-contiguously. That is, the WSOs may be distributed in slots. The receiving terminal(s) may periodically perform a reception operation of a wake-up signal and attempt to decode the wake-up signal. To support this operation, the receiving terminal(s) may periodically obtain a synchronization signal, and may maintain synchronization based on the synchronization signal. Therefore, the WSO slot may be configured in consideration of a transmission period of the synchronization signal. For example, a slot after the transmission period of the synchronization signal (e.g., a slot in which the synchronization signal is transmitted) may be configured as the WSO slot. The WSO (e.g., WSO slot) may be relatively configured based on the transmission period of the synchronization signal within resource pool.

When Scheme 1 is used in the exemplary embodiments shown in FIGS. 10 and 11, the WSO bitmap may include 10 bits. That is, the size of the WSO bitmap may be the same as the size of the resource bitmap. When Scheme 2 is used in the exemplary embodiments shown in FIGS. 10 and 11, the WSO bitmap may include 6 bits. That is, the WSO bitmap may indicate whether a WSO is configured in each of 6 slots configured as the resource pool by the resource bitmap. A configuration periodicity of the WSO may be the same as a configuration periodicity of the resource pool. Alternatively, the configuration periodicity of the WSO may be set differently from the configuration periodicity of the resource pool.

Periodicity information (e.g., WSO and/or resource pool configuration periodicity information) may be transmitted using one or a combination of two or more of higher layer signaling, MAC signaling, and PHY signaling. The WSO may be configured by a function instead of the WSO bitmap. Alternatively, the WSO(s) may be configured in m slot(s) from the k-th slot or slots from the k-th slot to the p-th slot based on a resource (e.g., slot) reserved for S-SSB transmission. Information (e.g., k, m, and/or p) indicating the slot(s) in which the WSO is configured may be transmitted using one or a combination of two or more of higher layer signaling, MAC signaling, and PHY signaling. Here, each of k, m, and p may be a natural number.

A reference of the resource reserved for S-SSB transmission may be the first slot or the last slot among the slot(s) in which the S-SSB is transmitted. Alternatively, the reference of the resource reserved for S-SSB transmission may be the first slot or the last slot among slot(s) in which a primary sidelink synchronization signal (e.g., PSSS), a secondary sidelink synchronization signal (e.g., SSSS), or a PSBCH constituting the S-SSB is transmitted. The reference of the resource reserved for S-SSB transmission may be interpreted as follows.

The WSO may be configured based on an absolute resource position of the slot(s) in which the S-SSB is transmitted. In this case, the WSO may be indicated based on an absolute position of a physical resource, not a relative reference for the slot configured as the resource pool.

The WSO may be configured according to a slot belonging to the resource pool based on a position of the resource in which the S-SSB is transmitted. In this case, after the S-SSB is transmitted, the WSO may be configured based on the slot(s) belonging to the resource pool. For example, when slot(s) belonging to a resource pool exists from the fourth slot after transmission of the S-SSB, the first slot after a transmission resource of the S-SSB may refer to the first slot within the resource pool after a transmission time of the S-SSB, and the first slot after the transmission resource of the S-SSB may be the fourth slot after the transmission of the S-SSB based on the absolute position of the resource.

The WSO may be configured based on a function. Variables in the function for configuring WSO(s) may be a system frame index, radio frame index, resource pool configuration information (e.g., resource bitmap), identifier (e.g., ID) of the receiving terminal, identifier of the transmitting terminal, group ID, cell ID, transmission periodicity of a wake-up signal (e.g., configuration periodicity of WSO), variable(s) related to transmission resource configuration of synchronization signals, and/or new variable(s) configured by higher layer signaling.

A radio frame capable of transmitting a wake-up signal may be indicated by a function based on various variables, and a slot capable of transmitting the wake-up signal within the radio frame may be indicated by a WSO bitmap. Alternatively, all radio frames and slots capable of transmitting a wake-up signal may be indicated by a function. Alternatively, a radio frame capable of transmitting a wake-up signal may be indicated by a bitmap, and a slot capable of transmitting the wake-up signal within the radio frame may be indicated by a function.

2-2. Method of Configuring a Specific Resource Region Outside a Resource Pool as WSO(s)

FIG. 12 is a conceptual diagram illustrating a fourth exemplary embodiment of a WSO configuration method in a communication system.

As shown in FIG. 12, WSO(s) may be configured in slot(s) that do not belong to a resource pool. A resource bitmap may indicate whether a resource pool is configured in each of 10 slots. The 10 slots configured by the resource bitmap may be contiguous slots or non-contiguous slots. The non-contiguous slots may be slots excluding slot(s) reserved for transmission of signals and/or channels among contiguous slots. A bit set to a first value (e.g., 0) in the resource bitmap may indicate that the resource pool is not configured in slot(s) mapped to the bit (e.g., the slot(s) does not belong to the resource pool) and, a bit set to the second value (e.g., 1) in the resource bitmap may indicate that the resource pool is configured in slot(s) mapped to the bit (e.g., the slot(s) belongs to the resource pool). Each bit included in the resource bitmap may be mapped to one slot or a plurality of slots. The resource bitmap may be applied based on a preset periodicity. When the preset periodicity is two radio frames, the resource bitmap may be applied to every two radio frames. The preset periodicity for the resource bitmap may be indicated by one or a combination of two or more of higher layer signaling, MAC signaling, and PHY signaling.

The resource bitmap may be set to [1 0 0 1 1 1 0 0 1 1], and may be applied to radio frames #1, #3, #5, #7, and the like. That is, since the same resource bitmap may be applied to every two radio frames, the resource pool may be identically configured for every two radio frames. A WSO slot may be a slot capable of transmitting a wake-up signal. The WSO (e.g., WSO slot) may be configured among slots that are not configured as the resource pool. A configuration periodicity of the WSO (e.g., WSO slot) may be the same as the configuration periodicity of the resource pool.

FIG. 13 is a conceptual diagram illustrating a second exemplary embodiment of a WSO indication method in a communication system.

As shown in FIG. 13, a WSO bitmap may indicate whether a WSO is configured in each of slots. The WSO bitmap may be configured based on Scheme 1 or Scheme 2. When Scheme 1 is used, the number of bits included in the WSO bitmap may be the same as the number of bits included in the resource bitmap. That is, a configuration unit of the WSO bitmap may be the same as a configuration unit of the resource bitmap. In this case, the WSO bitmap may indicate whether a WSO is configured in each of all slots (e.g., 10 slots) associated with the resource bitmap. According to Scheme 1, the WSO bitmap may be set to [0 0 0 0 0 0 1 1 0 0].

When Scheme 2 is used, whether a WSO is configured in each of slots (e.g., 4 slots) in which the resource pool is not configured among all slots (e.g., 10 slots) associated with the resource bitmap may be indicated. The slots in which resource pool is not configured may be indicated by the resource bitmap. According to Scheme 2, the WSO bitmap may be set to [0 0 1 1]. A bit set to a first value (e.g., 0) in the WSO bitmap may indicate that WSO(s) is not configured in slot(s) mapped to the bit, and a bit set to a second value (e.g., 1) in the WSO bitmap may indicate that WSO(s) is configured in slot(s) mapped to the bit. Each bit included in the WSO bitmap may be mapped to one slot or a plurality of slots.

A configuration periodicity of the WSO may be the same as a configuration periodicity of the resource pool. Alternatively, the configuration periodicity of the WSO may be different from the configuration periodicity of the resource pool. The configuration periodicity of the WSO may be indicated by one or a combination of two or more of higher layer signaling, MAC signaling, and PHY signaling. The WSO may be configured by a function instead of the WSO bitmap. Variables in the function for configuring WSO(s) may be a system frame index, radio frame index, resource pool configuration information (e.g., resource bitmap), identifier of the receiving terminal, identifier of the transmitting terminal, group ID, cell ID, transmission periodicity of a wake-up signal (e.g., configuration periodicity of WSO), and/or new variable(s) configured by higher layer signaling.

A radio frame capable of transmitting a wake-up signal may be indicated by a function based on various variables, and a slot capable of transmitting the wake-up signal within the radio frame may be indicated by a WSO bitmap. Alternatively, all radio frames and slots capable of transmitting a wake-up signal may be indicated by a function. Alternatively, a radio frame capable of transmitting a wakeup signal may be indicated by a bitmap, and a slot capable of transmitting the wake-up signal within the radio frame may be indicated by a function.

FIG. 14 is a conceptual diagram illustrating a fifth exemplary embodiment of a WSO configuration method in a communication system.

As shown in FIG. 14, a configuration periodicity of WSO(s) (e.g., WSO slot(s)) may be different from a configuration periodicity of a resource pool. The WSO may be configured every 4 radio frames, and the resource pool may be configured every 2 radio frames. A periodicity of the WSO may be set in units of radio frames or n slots. Here, n may be a natural number. A bitmap (e.g., resource bitmap and/or WSO bitmap) may be configured in units of n slots. The unit of the n slots may be configured to be the same as a configuration unit of the resource pool. Alternatively, the unit of the n slots may be configured differently from the configuration unit of the resource pool.

FIG. 15 is a conceptual diagram illustrating a sixth exemplary embodiment of a WSO configuration method in a communication system.

As shown in FIG. 15, WSOs (e.g., WSO slots) may be configured non-contiguously. That is, the WSOs may be distributed in slots. The receiving terminal(s) may periodically perform an operation of receiving a wake-up signal and attempt to decode the wake-up signal. To support this operation, the receiving terminal(s) may periodically obtain a synchronization signal, and may maintain synchronization based on the synchronization signal. Therefore, the WSO slots may be configured in consideration of a transmission periodicity of the synchronization signal. For example, a slot after a transmission period of the synchronization signal may be configured as the WSO slot. The WSO (e.g., WSO slot) may be configured relatively based on the transmission period of the synchronization signal within the resource pool.

When Scheme 1 is used in the exemplary embodiments shown in FIGS. 14 and 15, the WSO bitmap may include 10 bits. That is, the size of the WSO bitmap may be the same as the size of the resource bitmap. When Scheme 2 is used in the exemplary embodiments shown in FIGS. 14 and 15, the WSO bitmap may include 4 bits. That is, the WSO bitmap may indicate whether a WSO is configured in each of four slots that are not configured as the resource pool by the resource bitmap. The configuration periodicity of the WSO may be the same as the configuration periodicity of the resource pool. Alternatively, the configuration periodicity of the WSO may be set differently from the configuration periodicity of the resource pool.

Periodicity information (e.g., WSO and/or resource pool configuration periodicity information) may be transmitted using one or a combination of two or more of higher layer signaling, MAC signaling, and PHY signaling. The WSO may be configured by a function instead of the WSO bitmap. Alternatively, the WSO may be configured in m slot(s) from k-th slot or slots from the k-th slot to the p-th slot based on a transmission region of synchronization signals (e.g., S-SSB). Information (e.g., k, m, and/or p) indicating the slot(s) in which the WSO is configured may be transmitted using one or a combination of two or more of higher layer signaling, MAC signaling, and PHY signaling. Here, each of k, m, and p may be a natural number.

The WSO may be configured based on a function. Variables in the function for configuring the WSO(s) may be a system frame index, radio frame index, resource pool configuration information (e.g., resource bitmap), ID of the receiving terminal, ID of the transmitting terminal, group ID, cell ID, transmission periodicity of a wake-up signal (e.g., configuration periodicity of the WSO), variable(s) related to transmission resource configuration of synchronization signals, and/or new variable(s) configured by higher layer signaling.

A radio frame capable of transmitting a wake-up signal may be indicated by a function based on various variables, and a slot capable of transmitting the wake-up signal within the corresponding radio frame may be indicated by a WSO bitmap. Alternatively, all radio frames and slots capable of transmitting a wake-up signal may be indicated by a function. Alternatively, a radio frame capable of transmitting a wake-up signal may be indicated by a bitmap, and a slot capable of transmitting the wake-up signal within the radio frame may be determined by a function.

FIG. 16 is a conceptual diagram illustrating a seventh exemplary embodiment of a WSO configuration method in a communication system.

As shown in FIG. 16, WSO(s) may be configured in slot(s) within a radio frame in which a resource pool is not configured. Here, a resource bitmap for each of radio frames #2 and #6 may be set to [0 0 0 0 0 0 0 0 0 0]. A wake-up signal may be transmitted for public safety. The WSO(s) may be configured in any resource(s) outside the resource pool, and may be used for specific purposes. In this case, for configuration of the radio frames in which the WSO(s) is configured, periodicity information of the radio frames in which the WSO(s) is configured may be transmitted by one or a combination of two or more of higher layer signaling, MAC signaling, and PHY signaling. Alternatively, the periodicity of the radio frame(s) in which the WSO(s) are configured may be indicated by a function.

A WSO slot within a radio frame may be indicated by a WSO bitmap or a function. In this case, variables in the function for configuring WSO(s) (e.g., WSO slot(s)) may be a system frame index, radio frame index, resource pool configuration information (e.g., resource bitmap), ID of the receiving terminal, ID of the transmitting terminal, group ID, cell ID, transmission periodicity of a wake-up signal (e.g., configuration periodicity of the WSO), variable(s) related to transmission resource configuration of synchronization signals, and/or new variable(s) configured by higher layer signaling.

The WSO(s) may be configured only within the resource pool. Alternatively, the WSO(s) may be configured only in resources outside the resource pool. The resources outside the resource pool may be slot(s) not configured as the resource pool within the radio frame to which the resource pool belongs and radio frames in which resource pools are not configured. Combinations of the exemplary embodiments shown in FIGS. 8 to 16 may be used. Alternatively, the exemplary embodiment(s) expanded and/or modified from the exemplary embodiments shown in FIGS. 8 to 16 may be used.

2-3. Method of Configuring WSO(s) in Resource Pools Used in Adjacent Regions

FIG. 17 is a conceptual diagram illustrating an eighth exemplary embodiment of a WSO configuration method in a communication system.

As shown in FIG. 17, common WSO(s) may be configured in resource pools allocated to adjacent regions (e.g., region #1, region #2, region #3). The region may mean a zone. The same resources (e.g., the same slots) in the resource pools allocated to the adjacent regions may be configured as WSO(s). The same slots may be common slots for which the resource pools are configured. In order to efficiently perform a wake-up signal transmission operation in a specific situation, the same resources may be configured as WSO(s). The specific situation may be when a broadcast or groupcast-based wake-up signal transmission operation is performed, when interference management (e.g., interference cancellation) between wake-up signals is required, and/or the like.

In each of the regions, one resource region (e.g., radio frame) may include 10 slots, and a resource bitmap may include 10 bits to indicate whether a resource pool is configured in each of 10 slots belonging to one resource region. Alternatively, the number of bits included in the resource bitmap is not limited to 10, and may be set variously. The resource pool may be repeatedly configured at a specific periodicity based on the resource bitmap. The resource bitmap for the region #1 may be set to [1 0 1 1 0 0 1 1 0 0], the resource bitmap for the region #2 may be set to [0 0 1 0 0 1 1 0 1 1], and the resource bitmap for the region #3 may be set to [0 1 1 1 1 0 1 0 0 0].

FIG. 18 is a conceptual diagram illustrating a third exemplary embodiment of a WSO indication method in a communication system.

As shown in FIG. 18, a WSO bitmap may indicate whether a WSO is configured in each of slots. The WSO bitmap may be configured based on Scheme 1 or Scheme 2. When Scheme 1 is used, the number of bits included in the WSO bitmap may be the same as the number of bits included in the resource bitmap. That is, a configuration unit of the WSO bitmap may be the same as a configuration unit of the resource bitmap. In this case, the WSO bitmap may indicate whether WSO(s) is configured in each of all slots (e.g., 10 slots) associated with the resource bitmap. According to Scheme 1, the WSO bitmap may be set to [0 0 1 0 0 0 1 0 0 0].

Alternatively, the WSO (e.g., WSO slot) may be indicated based on slot(s) in which the resource pool is configured for each region. When Scheme 2 is used, whether the WSO is configured in each of slots (e.g., 5 slots) in which the resource pool is configured among all slots (e.g., 10 slots) associated with the resource bitmap. The slots in which the resource pool is configured may be indicated by the resource bitmap. According to Scheme 2, the WSO bitmap for the region #1 may be set to [0 1 0 1 0], the WSO bitmap for the region #2 may be set to [1 0 1 0 0], and the WSO bitmap for the region #3 may be set to [0 1 0 0 1]. A bit set to a first value (e.g., 0) in the WSO bitmap may indicate that WSO(s) is not configured in slot(s) mapped to the bit, and a bit set to a second value (e.g., 1) in the WSO bitmap may indicate that WSO(s) is configured in slot(s) mapped to the bit.

When Scheme 2 is used, since slots for which the resource pool is configured are different for each region, even when the same slot(s) is configured as the WSO slot(s) in the regions, the WSO bitmap may be set differently for each region.

FIG. 19 is a conceptual diagram illustrating a ninth exemplary embodiment of a WSO configuration method in a communication system.

As shown in FIG. 19, common WSO(s) may be configured in the same resources (e.g., the same slots) that are not configured as resource pools in adjacent regions (e.g., region #1, region #2, region #3). The same slots may be shared slots for which the resource pool(s) is not configured.

FIG. 20 is a conceptual diagram illustrating a fourth exemplary embodiment of a WSO indication method in a communication system.

As shown in FIG. 20, a WSO bitmap may indicate whether a WSO is configured in each of slots. The WSO bitmap may be configured based on Scheme 1 or Scheme 2.

When Scheme 1 is used, the number of bits included in the WSO bitmap may be the same as the number of bits included in a resource bitmap. In this case, the WSO bitmap may indicate whether the WSO is configured in each of all slots (e.g., 10 slots) associated with the resource bitmap. According to Scheme 1, the WSO bitmap may be set to [0 0 1 0 0 0 1 0 0 0].

When Scheme 2 is used, whether the WSO is configured in each of slots (e.g., 7 slots) in which the resource pool is not configured among all slots (e.g., 10 slots) associated with the resource bitmap. The slots in which the resource pool is not configured may be indicated by the resource bitmap. According to Scheme 2, the WSO bitmap for the region #1 may be set to [0 1 0 0 1 0 0], the WSO bitmap for the region #2 may be set to [0 0 1 0 0 1 0], and the WSO bitmap for the region #3 may be set to [0 1 0 1 0 0 0].

The WSO(s) (e.g., WSO slot(s)) may be indicated by a function instead of the WSO bitmap. In this case, variables in the function for configuring the WSO(s) may be a system frame index, radio frame index, resource pool configuration information (e.g., resource bitmap), ID of the receiving terminal, ID of the transmitting terminal, group ID, cell ID, transmission periodicity of a wake-up signal (e.g., configuration periodicity of the WSO), variable(s) related to transmission resource configuration of synchronization signals, and/or new variable(s) configured by higher layer signaling.

The periodicity of the resource region composed of a radio frame or n slots may be indicated by one or a combination of two or more of higher layer signaling, MAC signaling, and PHY signaling. Alternatively, the periodicity of the resource region composed of a radio frame or n slots may be indicated by a function or a bitmap. Here, n may be a natural number.

The WSO may be configured in units of symbols. In order to indicate the WSO configured in units of symbols, the above-described exemplary embodiments may be modified or extended. In addition, not only a time region but also a frequency region for the WSO may be configured. Configuration of symbol(s) and/or subcarrier(s) that can be used within a slot may be expressed using a function based on a terminal-related ID (e.g., ID of the transmitting terminal and/or the receiving terminal). Alternatively, using fixed symbol(s) and/or fixed subcarrier(s) within each slot may be indicated by one or a combination of two or more of higher layer signaling, MAC signaling, and PHY signaling.

Figure 21:
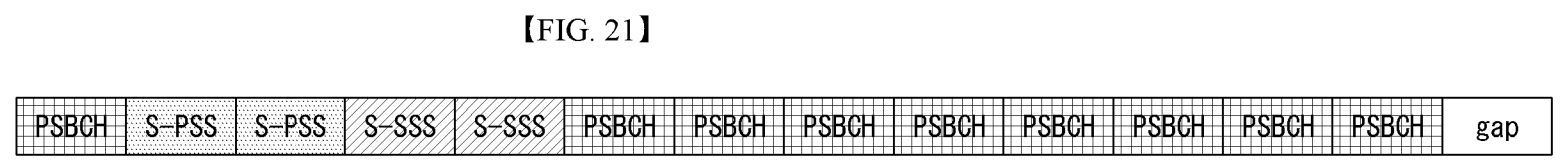

2-4. Method of Configuring a Wake-Up Signal Transmission Period Independent of a Resource Pool FIG. 21 is a conceptual diagram illustrating a first exemplary embodiment of a structure of an S-SSB when a normal cyclic prefix (CP) is used.

As shown in FIG. 21, a transmission resource of a wake-up signal may be an empty time and/or frequency resource within a resource region configured for SSB or S-SSB transmission. A wake-up signal may be transmitted in a gap after the last PSBCH. A resource allocation of symbol(s) and/or subcarrier(s) in the gap may be expressed using a function based on a terminal-related ID (e.g., ID of the transmitting terminal and/or the receiving terminal). Using fixed symbol(s) and/or fixed subcarrier(s) in each slot may be indicated by one or a combination of two or more of higher layer signaling, MAC signaling, and PHY signaling.

3. Design of a Wake-Up Signal, Identification Method of a Wake-Up Signal, and Operations of a Receiving Terminal Receiving a Wake-Up Signal For PHY DRX operations, a wake-up signal may be designed to be detectable in a PHY layer without a decoding operation in a MAC layer. The wake-up signal may have a sequence form. Alternatively, the wake-up signal may be expressed by varying an energy (e.g., transmission power) for each tone. The wake-up signal may be generated based on an orthogonal sequence or a semi-orthogonal sequence. To generate the wake-up signal, a random sequence (e.g., pseudo-random sequence) generated by a specific function may be generated. When a Zadoff-Chu (ZC) sequence is used, a plurality of sequences may be generated by cyclic shifts with respect to a base sequence generated based on a different root value or the same root value. The plurality of sequences may include a sequence #1, a sequence #2, and the like.

The receiving terminal may identify a transmitting entity of the wake-up signal. When a plurality of wake-up signals are received, the receiving terminal may identify a wake-up signal for itself from among the plurality of received wake-up signals. In order to support this operation, one or more sequences may be assigned to each transmitting terminal, and information (e.g., sequence index, etc.) on a sequence used may be transmitted to the receiving terminal. The information on the sequence used may be configured to the receiving terminal by one or a combination of two or more of higher layer signaling, MAC signaling, and PHY signaling before the receiving terminal operates in the sleep mode. A wake-up signal for transmission of a short message for public safety use may be generated based on a specific sequence. The sequence information may be transmitted together with the above-described configuration information (e.g., PHY DRX configuration information). Alternatively, the sequence information may be included in system information transmitted to the transmitting terminal and/or the receiving terminal.

Sequence(s) for the wake-up signal may be configured as shown in Table 8 below. The total number of sequences may be 8. The sequences #1 to #6 may be used for a wake-up signal of each transmitting terminal, and the sequences #7 and #8 may be used for specific alert messages (e.g., messages for public safety purposes).

TABLE 8

| Sequence | Usage |
| --- | --- |
| Sequence #1 | Wake-up signal of transmitting terminal #1 |
| Sequence #2 | Wake-up signal of transmitting terminal #2 |
| Sequence #3 | Wake-up signal of transmitting terminal #3 |
| Sequence #4 | Wake-up signal of transmitting terminal #4 |
| Sequence #5 | Wake-up signal of transmitting terminal #5 |
| Sequence #6 | Wake-up signal of transmitting terminal #6 |
| Sequence #7 | Specific alert message #1 |
| Sequence #8 | Specific alert message #2 |

For example, the transmitting terminal #3 may transmit a wake-up signal generated based on the sequence #3 in the WSO. The receiving terminal may perform a monitoring operation to receive a wake-up signal in the WSO. When the sequence #3 is detected in the WSO, the receiving terminal may determine that the wake-up signal of the transmitting terminal #3 has been received. Alternatively, when the sequence #7 or #8 is detected in the WSO, the receiving terminal may determine that the specific alert message #1 or #2 has been received. One or more sequences may be assigned to the transmitting terminal. When the transmitting terminal is a transmitting entity of two or more sidelinks, a plurality of sequences may be assigned to the transmitting terminal.

To assign one or more sequences to one transmitting terminal, cyclic shifts may be used. As shown in Table 9 below, a base sequence and cyclic shifts for each of the transmitting terminal and the receiving terminal may be configured (e.g., assigned).

TABLE 9

| Base sequence | Cyclic shift(s) | usage |
| --- | --- | --- |
| Sequence #1 | X1, Y1, Z1 | Wake-up signal of transmitting terminal #1 |
| Sequence #2 | X2, Y2 | Wake-up signal of transmitting terminal #2 |
| Sequence #3 | X3 | Wake-up signal of transmitting terminal #3 |
| Sequence #4 | X4, Y4 | Specific alert messages #1 and #2 |

The cyclic shift value(s) for the base sequence may be configured to the receiving terminal. The transmitting terminal #1 may generate three sequences using the cyclic shifts X1, Y1, and Z1, and may transmit three wake-up signals using the three sequences. The three wake-up signals may be distinguished at the receiving terminal. That is, the receiving terminal may distinguish the plurality of wake-up signals based on the cyclic shifts. When the transmitting terminal #1 performs three different sidelink communications, the transmitting terminal #1 may inform a value of a cyclic shift used in each sidelink communication (e.g., a cyclic shift used for generating a wake-up signal) to the receiving terminal. Configuration information of the base sequence and/or cyclic shifts may be transmitted using one or a combination of two or more of higher layer signaling, MAC signaling, and PHY signaling. The receiving terminal may obtain the configuration information of the base sequence and/or cyclic shifts before entering the sleep mode. In unicast-based sidelink communication, some receiving terminals may operate in the sleep mode. In this case, the transmitting terminal may generate a wake-up signal by applying a cyclic shift corresponding to sidelink communication associated with some receiving terminals operating in the sleep mode to the base sequence, and may transmit the generated wake-up signal.

The sequence #4 may be used for public safety purposes. Cyclic shifts may be used to generate the specific alert messages. A sequence may be assigned for each of the specific alert messages. Alternatively, one base sequence and a plurality of different cyclic shifts may be configured for a plurality of specific alert messages. In this case, the transmitting terminal may generate a plurality of specific alert messages by applying a plurality of different cyclic shifts to one base sequence.

The transmitting terminal may select a sequence from among available sequences, and may transmit a wake-up signal using the selected sequence. Based on a function taking a specific identifier (e.g., an ID of the transmitting terminal or an ID assigned to a sidelink) as an input, the transmitting terminal may select one or more sequences from among a plurality of sequences. Alternatively, the transmitting terminal may randomly select one or more sequences from among a plurality of sequences.

As shown in Table 10 below, a set of available sequences may be preconfigured for each cast type. The transmitting terminal select sequence(s) according to a specific function (e.g., a function using an ID of the transmitting terminal or an ID assigned to a sidelink as an input) from a sequence set (e.g., a plurality of sequences) corresponding to a cast type, and generate wake-up signal(s) based on the selected sequence(s). Alternatively, the transmitting terminal may randomly select sequence(s) from a sequence set (e.g., a plurality of sequences) corresponding to a cast type, and generate wake-up signal(s) based on the selected sequence(s).

TABLE 10

| Cast type | Root values | Cyclic shifts |
|---|---|---|
| Groupcast | X1, X2, X3 | Z2, Z4, Z6, Z8 |
| Unicast | Y1, Y2, Y3, Y4 | Z1, Z3, Z5, Z7 |

When a sequence is selected based on the identifier of the transmitting terminal, the transmitting terminal may not inform the receiving terminal of information on the selected sequence. Even in this case, transmission/reception operations of a wake-up signal may be performed without any problem. When information (e.g., the identifier of a transmitting terminal) used for sequence selection is preconfigured (e.g., transmitted) to the receiving terminal, the above-described operation may be usable. When a sequence is randomly selected and/or when a sequence is selected based on information that the receiving terminal does not know, the transmitting terminal may transmit (or indicate) information used for the selection of the sequence to the receiving terminal through one or a combination of one or more of higher layer signaling, MAC signaling, and PHY signaling. The information used for sequence selection may be transmitted before the receiving terminal operates in the sleep mode. Table 10 may further include configuration information (e.g., root value and/or cyclic shift) of a sequence for broadcasting.

A sequence of a synchronization signal used by the transmitting terminal may be configured as a wake-up signal. Alternatively, a modified form of a synchronization signal (e.g., a sequence of the synchronization signal) may be used as a wake-up signal. Even when the receiving terminal synchronizes with a communication node other than the transmitting terminal, the receiving terminal may receive the synchronization signal of the transmitting terminal based on the synchronization with the other communication node. The receiving terminal may obtain information on the sequence of the synchronization signal used by the transmitting terminal by receiving the synchronization signal of the transmitting terminal. As shown in Table 11 below, sequence(s) of the wake-up signal may be generated by applying cyclic shift value(s) to the sequence (e.g., synchronization sequence) of the synchronization signal of the transmitting terminal.

TABLE 11

| Synchronization signal | Cyclic shifts | Wake-up signals |
|---|---|---|
| Synchronization sequence #1 | X1, Y1, Z1 | Sequence #1, #2, #3 |

A plurality of wake-up signals (e.g., sequences) may be generated based on one synchronization sequence #1. The synchronization sequence #1 may be used as a wake-up signal sequence as it is. By applying cyclic shift value(s) to the synchronization sequence #1, additional sequence(s) may be generated, and the additional sequence(s) may be used as sequence(s) of the wake-up signal. By applying three cyclic shift values to the synchronization sequence #1 of the transmitting terminal, three sequences for the wake-up signal may be generated.

The cyclic shift value(s) used for generation of the wake-up signal may be included in the PHY DRX configuration information (e.g., wake-up signal configuration information) transmitted to the receiving terminal. The cyclic shift value(s) may be configured (or indicated) to the receiving terminal through one or a combination of two or more of higher layer signaling, MAC signaling, and PHY signaling. The cyclic shift value(s) may be transmitted before the receiving terminal operates in the sleep mode. The sequence of the wake-up signal may be generated based on a modified scheme other than the value of the cyclic shift. In this case, configuration information for another modified scheme may be included in the PHY DRX configuration information (e.g., wake-up signal configuration information) transmitted to the receiving terminal. The configuration information for another modified scheme may be configured (or indicated) to the receiving terminal through one or a combination of two or more of higher layer signaling, MAC signaling, and PHY signaling. The configuration information for another modified scheme may be transmitted before the receiving terminal operates in the sleep mode.

A different wake-up signal may be used for each of sidelink communications in the above-described exemplary embodiments. In this case, the receiving terminal may identify the transmitting terminal that has transmitted the wake-up signal. In addition, the receiving terminal may identify the wake-up signal for itself from among the plurality of received wake-up signals. When a wake-up signal is received at the receiving terminal operating in the sleep mode, the operation state of the receiving terminal may be transitioned to a communication ready state (e.g., connected mode). Thereafter, the receiving terminal may perform communication (e.g., sidelink communication).

A resource region monitored by the receiving terminal to receive a control channel may be configured (or indicated) by one or a combination of two or more of higher layer signaling, MAC signaling, and PHY signaling. The resource region monitored by the receiving terminal to receive a control channel may be transmitted before the receiving terminal operates in the sleep mode. After decoding of a control channel and/or data channel, the terminal (e.g., the receiving terminal) may perform an RRC reconfiguration operation, a system information (re)acquisition operation (e.g., update operation of system information), a reception operation of a message for public safety purposes, and/or a predefined operation based on a result of the decoding.

The PHY DRX operation may be performed using one wake-up signal commonly configured for a plurality of sidelink communications. In this case, the receiving terminal may identify the transmitting terminal that has transmitted a wake-up signal after receiving the corresponding wake-up signal. Thereafter, the receiving terminal may perform a reception operation on a control channel and/or data channel transmitted from the transmitting terminal to identify whether the received wake-up signal is for itself. In this case, a resource region monitored by the receiving terminal to receive the control channel may be configured (or indicated) by one or a combination of two or more of higher layer signaling, MAC signaling, and PHY signaling. The resource region monitored by the receiving terminal to receive the control channel may be transmitted before the receiving terminal operates in the sleep mode.

The control channel and/or data channel transmitted by the transmitting terminal may include ID(s) of the receiving terminal(s). The receiving terminal may identify whether the control channel and/or data channel includes its ID. When the control channel and/or data channel includes the ID of the receiving terminal, the receiving terminal perform an RRC reconfiguration operation, a system information (re) acquisition operation (e.g., update operation of system information), a reception operation of a message for public safety purposes, and/or a predefined operation based on a result of decoding the control channel and/or data channel. An ID (e.g., the ID of the receiving terminal) for indicating a wake-up target may be included in a second-stage SCI. Alternatively, a portion of the ID for indicating the wake-up target may be included in the second-stage SCI, and the remainder of the ID may be included in a data region of a PSSCH.

When a wake-up signal is transmitted from the base station to the receiving terminal(s), in order to identify a transmitting terminal associated with the wake-up signal at the receiving terminal(s), a SCI may include the ID of the transmitting terminal. In unicast-based sidelink communication, the SCI may further include ID information related to the transmitting terminal. In groupcast-based sidelink communication, the SCI may further include a specific group ID.

The transmitting terminal may use one common wake-up signal and a sequence used for specific sidelink communication in common. In order to use one common wake-up signal and the sequence in common, the above-described exemplary embodiments may be extended and/or modified. A sequence may be expressed by adjusting a tone energy for a specific resource element (RE) in a transmission region of the sequence.

4. Method of Selectively Using a PHY DRX Scheme and a MAC DRX Scheme

When a PHY DRX scheme (e.g., PHY DRX operation) is performed, a wake-up signal may be used. When a MAC DRX scheme (e.g., MAC DRX operation) is performed, a paging message may be used to transition the operation state of the receiving terminal. The wake-up signal may be a PHY layer signal detected in the PHY layer, and the paging message may be a MAC layer signal decoded in the MAC layer. The MAC DRX scheme may be performed based on MAC DRX configuration information configured by the base station. The PHY DRX scheme may be performed in conjunction with the MAC DRX scheme. When the PHY DRX scheme and the MAC DRX scheme are independently performed, a communication node (e.g., base station or transmitting terminal) may select one of the PHY DRX scheme and the MAC DRX scheme, and may perform the selected DRX scheme. Information indicating the DRX scheme (e.g., PHY DRX scheme and/or MAC DRX scheme) used by the communication node may be configured (or indicated)) to the receiving terminal by one or a combination of two or more of higher layer signaling, MAC signaling, and PHY signaling. The information indicating the DRX scheme used by the communication node may be transmitted before the receiving terminal operates in the sleep mode. The base station may transmit the information indicating the DRX scheme to be used to the transmitting terminal. The transmitting terminal may identify the DRX scheme used based on the information received from the base station. In addition, the transmitting terminal may transmit information indicating the identified DRX scheme to the receiving terminal(s). Alternatively, when the DRX scheme is selected by the transmitting terminal, the transmitting terminal may not inform the receiving terminal(s) of the selected DRX scheme.

When the PHY DRX scheme is selected by a communication node (e.g., base station or transmitting terminal), the communication node may transmit a wake-up signal. When the MAC DRX scheme is selected by a communication node (e.g., base station or transmitting terminal), the communication node may transmit a paging message.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method for operating a transmitting terminal in a wireless communication system, the method comprising:
   receiving, from a base station, first configuration information on sidelink discontinuous reception (DRX) for at least one of unicast, groupcast or broadcast, the first configuration information including information on a first value indicating a first time duration and a second value indicating a second time duration;
   transmitting, to a receiving terminal, second configuration information on the sidelink DRX;
   identifying on-duration for the sidelink DRX based on the first configuration information; and
   transmitting, to the receiving terminal, a physical layer signal during the on-duration,
   wherein one of the first value or the second value is used for an activity for the sidelink DRX based on the physical layer signal.

2. The method of claim 1, wherein the first configuration information includes sequence information indicating a sequence used to identify the transmitting terminal among a plurality of transmitting terminals.

3. The method of claim 2, wherein the sequence information includes a sequence and a cyclic shift value, wherein the physical layer signal comprises a wake-up signal, and wherein the wake-up signal is generated by applying the cyclic shift value to the sequence.

4. The method of claim 1, wherein the physical layer signal comprises a wake-up signal, and
   wherein the wake-up signal is generated based on a synchronization signal block (SSB) sequence of the base station or a sidelink(S)-SSB sequence of the transmitting terminal.

5. The method of claim 2, wherein the sequence information includes a sequence set configured for each cast type, wherein the physical layer signal comprises a wake-up signal, and
   wherein the wake-up signal is generated based on a sequence selected from the sequence set, and the cast type is the groupcast or the unicast.

6. The method of claim 1, wherein the first value indicates a first sidelink DRX cycle, and wherein the second value indicates a second sidelink DRX cycle.

7. The method of claim 6, wherein the physical layer signal comprises a wake-up signal, wherein the first sidelink DRX cycle is greater than the second sidelink DRX cycle, and wherein a sidelink DRX cycle among the first sidelink DRX cycle and the second sidelink DRX cycle is used according to a number of failures to detect the wake-up signal in the receiving terminal.

8. The method of claim 6, wherein the first sidelink DRX cycle or the second sidelink DRX cycle is set equal to an SSB periodicity of the base station or an S-SSB periodicity of the transmitting terminal.

9. A method for operating a receiving terminal in a communication system, the method comprising:

receiving, from a base station, first configuration information on sidelink discontinuous reception (DRX) configuration for at least one of unicast, groupcast or broadcast, the first configuration information including information on a first value indicating a first time duration and a second value indicating a second time duration;

receiving, from a transmitting terminal, second configuration information on the sidelink DRX;

identifying on-duration for the sidelink DRX based on the first configuration information; and performing a monitoring operation to detect a physical layer signal during the on-duration, wherein one of the first value or the second value is used for an activity for the sidelink DRX based on the physical layer signal.

10. The method of claim 9, wherein the first value indicates a first sidelink DRX cycle, wherein the second value indicates a second sidelink DRX cycle, wherein the physical layer signal comprises a wake-up signal, and wherein a sidelink DRX cycle among the first sidelink DRX cycle and the second sidelink DRX cycle is used according to a number of failures to detect the wake-up signal in the receiving terminal.

11. The method of claim 9, wherein the first value indicates a first sidelink DRX cycle, wherein the second value indicates a second sidelink DRX cycle, and wherein the first sidelink DRX cycle or the second sidelink DRX cycle is set equal to a synchronization signal block (SSB) periodicity of the base station or a sidelink(S)-SSB periodicity of the transmitting terminal.

12. The method of claim 9, wherein the first configuration information further includes sequence information, wherein the physical layer signal comprises a wake-up signal, and wherein the sequence information is used to identify a transmitting terminal having transmitted the wake-up signal among a plurality of transmitting terminals.

13. The method of claim 12, wherein the sequence information includes a sequence and a cyclic shift value, the wake-up signal is generated by applying the cyclic shift value to the sequence, and the wake-up signal is detected based on the sequence and the cyclic shift value.

14. The method of claim 12, wherein the sequence information includes a sequence set configured for each cast type, the wake-up signal is generated based on a sequence selected from the sequence set, and the cast type is the groupcast or the unicast.

15. The method of claim 9, wherein the physical layer signal comprises a wake-up signal, and wherein the wake-up signal is generated based on an SSB sequence of the base station or an S-SSB sequence of the transmitting terminal, and the wake-up signal is detected based on the SSB sequence or the S-SSB sequence.

16. A transmitting terminal in a wireless communication system, comprising:

a processor; and a memory storing one or more instructions executable by the processor, wherein the one or more instructions are executed to:

receive, from a base station, first configuration information on sidelink discontinuous reception (DRX) for at least one of unicast, groupcast or broadcast, the first configuration information including information on a first value indicating a first time duration and a second value indicating a second time duration;

transmit, to a receiving terminal, second configuration information on the sidelink DRX;

identify on-duration for the sidelink DRX based on the first configuration information; and transmit, to the receiving terminal, a physical layer signal during the on-duration, wherein one of the first value or the second value is used for an activity for the sidelink DRX based on the physical layer signal.

\* \* \* \* \*